(12) United States Patent
Fukuzawa et al.

(10) Patent No.: US 11,722,222 B2
(45) Date of Patent: Aug. 8, 2023

(54) TRANSCEIVER DEVICE

(71) Applicant: TDK CORPORATION, Tokyo (JP)

(72) Inventors: Hideaki Fukuzawa, Tokyo (JP); Tomohito Mizuno, Tokyo (JP); Tetsuya Shibata, Tokyo (JP); Takashi Kikukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/507,143

(22) Filed: Oct. 21, 2021

(65) Prior Publication Data

US 2022/0131612 A1 Apr. 28, 2022

(30) Foreign Application Priority Data

| Oct. 23, 2020 | (JP) | ................................. 2020-178235 |
| Jun. 23, 2021 | (JP) | ................................. 2021-103981 |
| Aug. 3, 2021 | (JP) | ................................. 2021-127523 |
| Aug. 4, 2021 | (JP) | ................................. 2021-128190 |

(51) Int. Cl.
  *H04B 10/40* (2013.01)
  *H04B 10/50* (2013.01)
  *H04B 10/532* (2013.01)

(52) U.S. Cl.
  CPC .......... *H04B 10/503* (2013.01); *H04B 10/40* (2013.01); *H04B 10/532* (2013.01)

(58) Field of Classification Search
  CPC ...................... H04B 10/40; H04B 10/69–6973
  See application file for complete search history.

(56) References Cited

U.S. PATENT DOCUMENTS

| 6,925,261 | B2 | 8/2005 | Haruyama | |
| 9,842,874 | B2 | 12/2017 | Nakata | |
| 2001/0040713 | A1 | 11/2001 | Haruyama | |
| 2002/0063919 | A1* | 5/2002 | Kovar | H04J 14/06 398/43 |
| 2007/0223149 | A1 | 9/2007 | Kim et al. | |
| 2008/0284010 | A1* | 11/2008 | Romig | H01L 24/83 257/737 |

(Continued)

FOREIGN PATENT DOCUMENTS

JP 2001-292107 A 10/2001

OTHER PUBLICATIONS

Azim et al., "Optical Receiver With Helicity-Dependent Magnetization Reversal," in IEEE Transactions on Magnetics, vol. 55, No. 1, pp. 1-6, Jan. 2019, doi: 10.1109/TMAG.2018.2878008 (Year: 2019).*

(Continued)

*Primary Examiner* — Nathan M Cors
(74) *Attorney, Agent, or Firm* — Oliff PLC

(57) ABSTRACT

A transceiver device includes: a receiving device including a magnetic element having a first ferromagnetic layer, a second ferromagnetic layer, and a spacer layer sandwiched between the first ferromagnetic layer and the second ferromagnetic layer, wherein the receiving device is configured to receive an optical signal; a transmission device including a modulated light output element, wherein the transmission device is configured to transmit an optical signal; and a circuit chip including an integrated circuit electrically connected to the magnetic element and the modulated light output element.

18 Claims, 20 Drawing Sheets

(56) References Cited

U.S. PATENT DOCUMENTS

| | | | |
|---|---|---|---|
| 2010/0008675 A1* | 1/2010 | De Dobbelaere | G02B 6/4295 398/135 |
| 2015/0333839 A1 | 11/2015 | Li et al. | |
| 2021/0159392 A1 | 5/2021 | Prasad et al. | |
| 2021/0404867 A1 | 12/2021 | Jaiswal et al. | |
| 2022/0010423 A1 | 1/2022 | Suzuki et al. | |
| 2022/0068537 A1 | 3/2022 | Mizuno et al. | |
| 2022/0260425 A1 | 8/2022 | Jacob et al. | |

OTHER PUBLICATIONS

Machida et al., "Spin Transfer Switching and MR Properties of Co/Pt Multilayered Free Layers for Submicron Sized Magneto-Optical Light Modulation Device," in IEEE Transactions on Magnetics, vol. 46, No. 6, pp. 2171-2174, Jun. 2010, doi: 10.1109/TMAG.2010.2042931. (Year: 2010).*

Chen et al.; "All-Optical Switching of Magnetic Tunnel Junctions with Single Subpicosecond Laser Pulses;" Physical Review Applied; 2017; vol. 7, 021001-1-021001-6.

Nov. 4, 2022 Office Action issued in U.S. Appl. No. 17/507,088.

U.S. Appl. No. 17/559,135, filed Dec. 22, 2021 in the name of Hideaki Fukuzawa.

U.S. Appl. No. 17/507,088, filed Oct. 21, 2021 in the name of Hideaki Fukuzawa.

U.S. Appl. No. 17/845,050, filed Jun. 21, 2022 in the name of Takekazu Yamane.

* cited by examiner

TRANSCEIVER DEVICE

BACKGROUND

The present disclosure relates to a transceiver device.

Priority is claimed on Japanese Patent Application No. 2020-178235, filed Oct. 23, 2020, Japanese Patent Application No. 2021-103981, filed Jun. 23, 2021, Japanese Patent Application No. 2021-127523, filed Aug. 3, 2021, and Japanese Patent Application No. 2021-128190, filed Aug. 4, 2021, the content of which is incorporated herein by reference.

Photoelectric conversion elements are used in various applications.

With the spread of the Internet, an amount of communication has increased dramatically and the importance of optical communication is increasing. Optical communication is a communication means configured to convert an electrical signal into an optical signal and perform transmission and reception using the optical signal.

For example, Patent Document 1 describes a receiving device configured to receive an optical signal using a photodiode. The photodiode is, for example, a pn junction diode using a pn junction of a semiconductor or the like.

PATENT DOCUMENTS

[Patent Document 1] Japanese Unexamined Patent Application, First Publication No. 2001-292107

SUMMARY

With the development of information and communication technology, a higher communication speed is required. In optical communication, higher frequencies for signal modulation are required. Photodetection elements using semiconductor pn junctions are widely used as photoelectric conversion elements, but novel breakthroughs are required for further development.

It is desirable to provide a novel transceiver device.

The following means is provided.

(1) According to a first aspect, there is provided a transceiver device including: a receiving device including a magnetic element having a first ferromagnetic layer, a second ferromagnetic layer, and a spacer layer sandwiched between the first ferromagnetic layer and the second ferromagnetic layer, wherein the receiving device is configured to receive an optical signal; a transmission device including a modulated light output element, wherein the transmission device is configured to transmit an optical signal; and a circuit chip including an integrated circuit electrically connected to the magnetic element and the modulated light output element.

(2) In the transceiver device according to the above-described aspect, the magnetic element and the modulated light output element may be arranged in a direction perpendicular to a surface of the circuit chip.

(3) In the transceiver device according to the above-described aspect, a position of the circuit chip in the direction is between a position of the magnetic element in the direction and a position of the modulated light output element in the direction.

(4) In the transceiver device according to the above-described aspect, a position of the magnetic element in the direction is between a position of the modulated light output element in the direction and a position of the circuit chip in the direction.

(5) In the transceiver device according to the above-described aspect, a position of the modulated light output element in the direction is between a position of the magnetic element in the direction and a position of the circuit chip in the direction.

(6) In the transceiver device according to the above-described aspect, the magnetic element and the modulated light output element may be positioned on a first surface side of the circuit chip, and the magnetic element and the modulated light output element may be configured not to overlap each other when viewed from the direction.

(7) In the transceiver device according to the above-described aspect, the magnetic element and the integrated circuit may be electrically connected via first through wiring that passes through an insulating layer between the magnetic element and the integrated circuit, and the modulated light output element and the integrated circuit may be electrically connected via second through wiring that passes through an insulating layer between the modulated light output element and the integrated circuit.

(8) In the transceiver device according to the above-described aspect, the modulated light output element and the integrated circuit may be electrically connected via a bump between the transmission device and the circuit chip.

(9) The transceiver device according to the above-described aspect may further include a wiring chip including wiring electrically connected to the magnetic element, the modulated light output element and the integrated circuit, wherein the magnetic element, the modulated light output element, and the circuit chip may be positioned on a first surface side of the wiring chip, and wherein the magnetic element, the modulated light output element, and the circuit chip may be configured not to overlap each other when viewed from a direction perpendicular to a surface of the wiring chip.

(10) In the transceiver device according to the above-described aspect, the modulated light output element may be an optical modulation element.

(11) In the transceiver device according to the above-described aspect, the optical modulation element may include a waveguide, and the waveguide may include lithium niobate.

(12) The transceiver device according to the above-described aspect may further include an input portion configured to apply light including a signal to the magnetic element; an output portion configured to output light including a signal generated by the modulated light output element; a first fiber configured to connect the input portion to an external portion; and a second fiber configured to connect the output portion to an external portion.

The transceiver device according to the above aspect is novel and creates a novel breakthrough.

DETAILED DESCRIPTION

Figure 1:
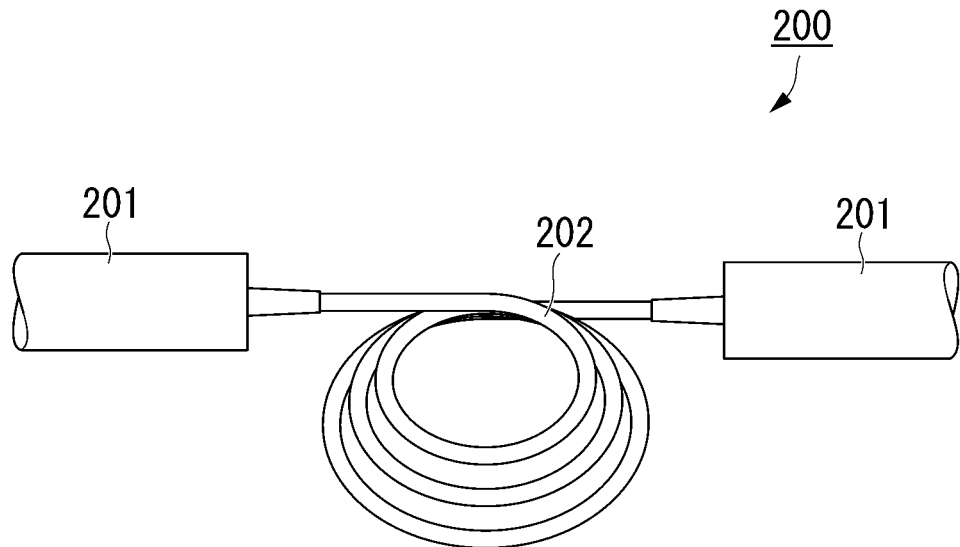
FIG. 1 is a conceptual diagram of a communication system according to a first embodiment.

Hereinafter, the present embodiment will be described in detail with reference to the drawings as appropriate. In the drawings used in the following description, featured parts may be enlarged parts for convenience so that the features of the present disclosure are easier to understand, and dimensional ratios and the like of the respective components may be different from actual ones. Materials, dimensions, and the like exemplified in the following description are examples, the present disclosure is not limited thereto, and modifications can be appropriately made in a range in which advantageous effects of the present disclosure are exhibited.

Directions will be defined. A plane on which a substrate 31 constituting a circuit chip 35 to be described below extends is defined as an xy plane, one direction within the plane is defined as an x direction, and a direction orthogonal to the x direction within the plane is defined as a y direction. Also, a direction orthogonal to the plane on which the substrate 31 spreads is defined as a z direction. Hereinafter, a +z direction may be expressed as an "upward" direction and a −z direction may be expressed as a "downward" direction. The +z direction is a direction from the substrate 31 to an insulating layer 34. The upward and downward directions do not always coincide with a direction in which gravity is applied.

First Embodiment

FIG. 1 is a conceptual diagram of a communication system 200 according to a first embodiment. The communication system 200 shown in FIG. 1 includes a plurality of transmission/reception components 201 and a fiber 202 connected between the transmission/reception components 201. The communication system 200 can be used, for example, for short- and medium-distance communication within and between data centers, and long-distance communication between cities. The transmission/reception component 201 is installed in, for example, a base station or a backbone station of a long-distance communication network within a data center. For example, the fiber 202 is connected between data centers. The communication system 200 performs communication between the transmission/reception components 201 via, for example, the fiber 202. In the communication system 200, wireless communication may be performed between the transmission/reception components 201 without involving the fiber 202.

Figure 2:
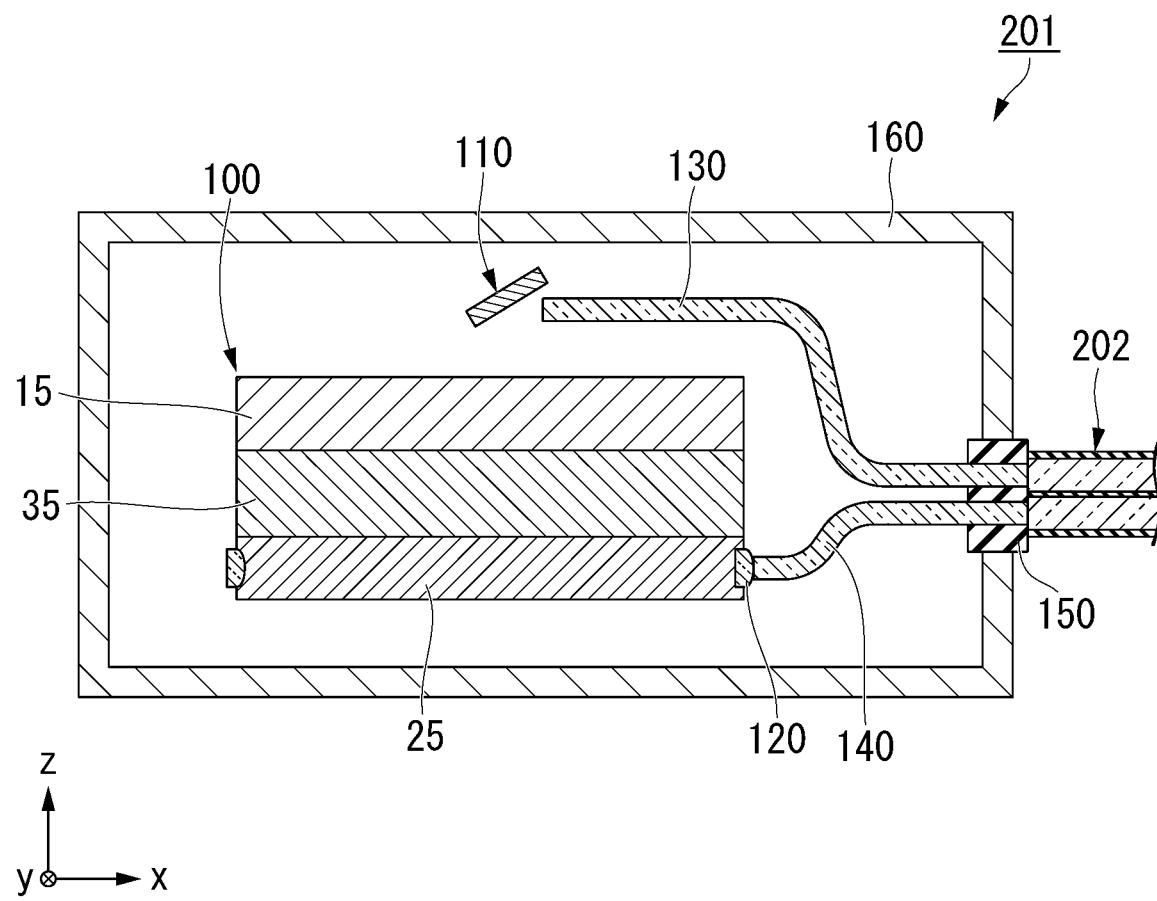
FIG. 2 is a cross-sectional view of a transmission/reception component according to the first embodiment.

FIG. 2 is a cross-sectional view of the transmission/reception component 201 according to the first embodiment. The transmission/reception component 201 includes a transceiver device 100, an input portion 110, an output portion 120, a first fiber 130, a second fiber 140, a connection portion 150, and a housing 160.

The transmission/reception component 201 is connected to the fiber 202 via the connection portion 150. The connection portion 150 is formed in the housing 160 and is exposed externally.

The first fiber 130 connects the connection portion 150, which is exposed externally, to the input portion 110. The first fiber 130 is, for example, an optical fiber. The input portion 110 is in a traveling direction of light output from an end of the first fiber 130. The input portion 110 irradiates the receiving device 15 of the transceiver device 100 with light including a signal output from the end of the first fiber 130. The input portion 110 is, for example, a mirror, a lens, or the like. The light transmitted from the fiber 202 to the transmission/reception component 201 is applied to the receiving device 15 via the first fiber 130 and the input portion 110.

The second fiber 140 connects the connection portion 150, which is exposed externally, to the output portion 120. The second fiber 140 is, for example, an optical fiber. The output portion 120 is connected to the transmission device 25 of the transceiver device 100. The output portion 120 outputs light including a signal generated by a modulated light output element of the transmission device 25. The output portion 120 is, for example, a lens or the like. The light output from the transmission device 25 propagates to the fiber 202 via the output portion 120 and the second fiber 140.

The transceiver device 100 is stored within the housing 160. The transceiver device 100 includes, for example, the receiving device 15, the transmission device 25, and the circuit chip 35. The receiving device 15, the transmission device 25, and the circuit chip 35 are laminated in the z direction.

Figure 3:
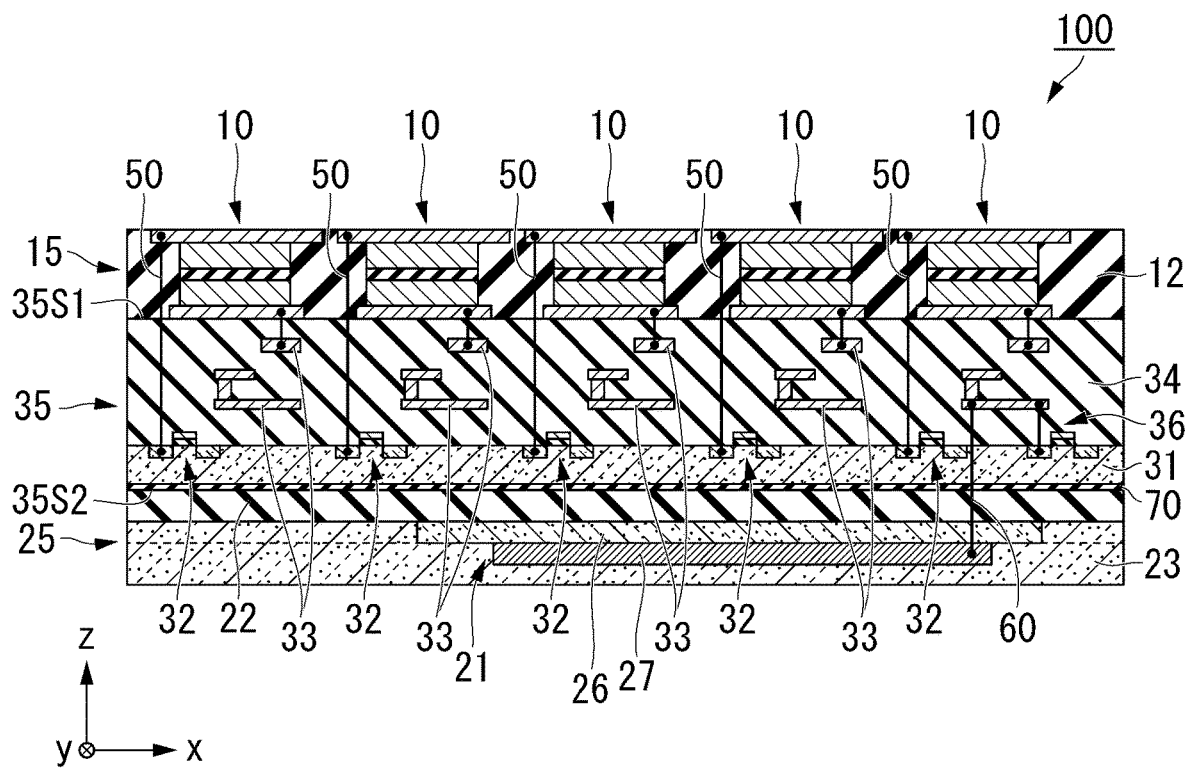
FIG. 3 is a cross-sectional view of a transceiver device according to the first embodiment.

FIG. 3 is a cross-sectional view of the transceiver device 100 according to the first embodiment. The receiving device 15 and the transmission device 25 are arranged on the circuit chip 35 in the z direction. The receiving device 15 includes a magnetic element 10. The transmission device 25 includes an optical modulation element 21. The magnetic element 10 and the optical modulation element 21 are arranged on the circuit chip 35 in the z direction. The circuit chip 35 is positioned between the receiving device 15 and the transmission device 25 in the z direction. A position of the circuit chip 35 in the z direction is between a position of the magnetic element 10 in the z direction and a position of the optical modulation element 21 in the z direction. For example, the receiving device 15 (the magnetic element 10) is on a first surface 35S1 side of the circuit chip 35 and the transmission device 25 (the optical modulation element 21) is on a second surface 35S2 side of the circuit chip 35. For example, the receiving device 15 (the magnetic element 10) is arranged on the first surface 35S1 of the circuit chip 35 and the transmission device 25 (the optical modulation element 21) is arranged on the second surface 35S2 of the circuit chip 35. The first surface 35S1 and the second surface 35S2 are surfaces of the circuit chip 35 facing each other in the z direction.

The receiving device 15 includes, for example, a plurality of magnetic elements 10 and an insulating layer 12. Although an example in which the receiving device 15 has a plurality of magnetic elements 10 is shown in FIG. 3, the number of magnetic elements 10 may be one. The receiving device 15 receives an optical signal input from the input portion 110 to the receiving device 15 and uses the magnetic element 10 to convert the received optical signal into an electrical signal. Details of the magnetic element 10 will be described below.

The insulating layer 12 covers the periphery of the magnetic element 10. The insulating layer 12 is, for example, an oxide of Si, Al, or Mg, a nitride, or an oxynitride. The insulating layer 12 includes, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$) and the like.

The transmission device 25 includes, for example, an optical modulation element 21. The transmission device 25 transmits an optical signal modulated by the optical modulation element 21. The optical modulation element 21 includes a substrate 22, a coating layer 23, a waveguide 26, and an electrode 27. Details of the optical modulation element 21 will be described below. The transmission device 25 is attached to the circuit chip 35 by, for example, an adhesive layer 70.

The circuit chip 35 includes a substrate 31, an electronic component 32, wiring 33, and an insulating layer 34. The circuit chip 35 controls operations of the receiving device 15 and the transmission device 25. The substrate 31 is a semiconductor substrate, for example, silicon. The electronic component 32 and the wiring 33 are parts of the integrated circuit 36. The integrated circuit 36 is electrically connected to the magnetic element 10 and the optical modulation element 21. The electronic component 32 is, for example, a transistor, a capacitor, or the like. The wiring 33 is connected between the electronic components 32 and the like. The insulating layer 34 is an interlayer insulating layer and a material similar to that of the insulating layer 12 can be used therefor. The insulating layer 34 covers the periphery of the electronic component 32 and the wiring 33.

The magnetic element 10 is provided on the insulating layer 34. The integrated circuit 36 (the electronic component 32 or the wiring 33) of the circuit chip 35 and the magnetic element 10 of the receiving device 15 are electrically connected via, for example, through wiring 50. The through wiring 50 extends in the z direction. The through wiring 50 passes through the insulating layer (for example, a part of the insulating layer 34 or a part of the insulating layer 34 and the insulating layer 12) between the magnetic element 10 and the integrated circuit 36 in, for example, the z direction. The through wiring 50 connects the magnetic element 10 to the integrated circuit 36 (the electronic component 32 or the wiring 33).

The integrated circuit 36 of the circuit chip 35 and the optical modulation element 21 of the transmission device 25 are electrically connected via, for example, through wiring 60. The through wiring 60 extends in the z direction. The through wiring 60 passes through insulating layers (for example, the substrate 22 having insulating properties and the adhesive layer 70) between the optical modulation element 21 and the integrated circuit 36 in, for example, the z direction. The through wiring 60 connects the optical modulation element 21 to the electronic component 32 or the wiring 33.

Figure 4:
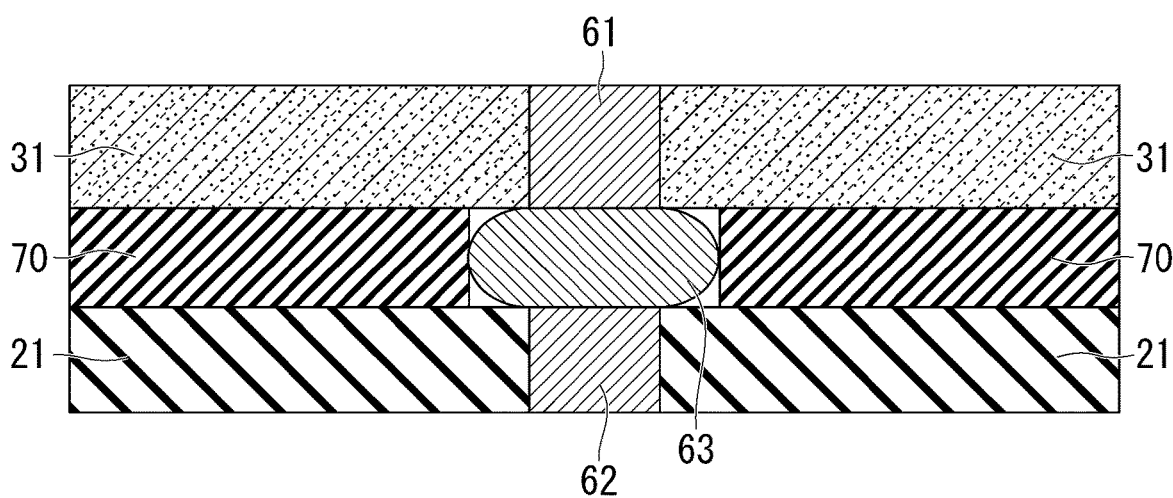
FIG. 4 is an enlarged cross-sectional view of a feature portion between a circuit chip and a transmission device according to the first embodiment.

The transmission device 25 and the circuit chip 35 sandwiching the adhesive layer 70 may be electrically connected via the bump 63. FIG. 4 is an enlarged cross-sectional view of a feature portion between the circuit chip 35 and the transmission device 25 according to the first embodiment. The bump 63 connects through wiring 61 passing through the substrate 31 of the circuit chip 35 to through wiring 62 passing through the substrate 22 of the transmission device 25. The bump 63 is, for example, solder or the like. The through wiring 61 electrically connects the integrated circuit 36 to the bump 63. The through wiring 62 electrically connects the optical modulation element 21 to the bump 63. The optical modulation element 21 and the integrated circuit 36 are electrically connected via the bump 63 between the transmission device 25 and the circuit chip 35.

Figure 5:
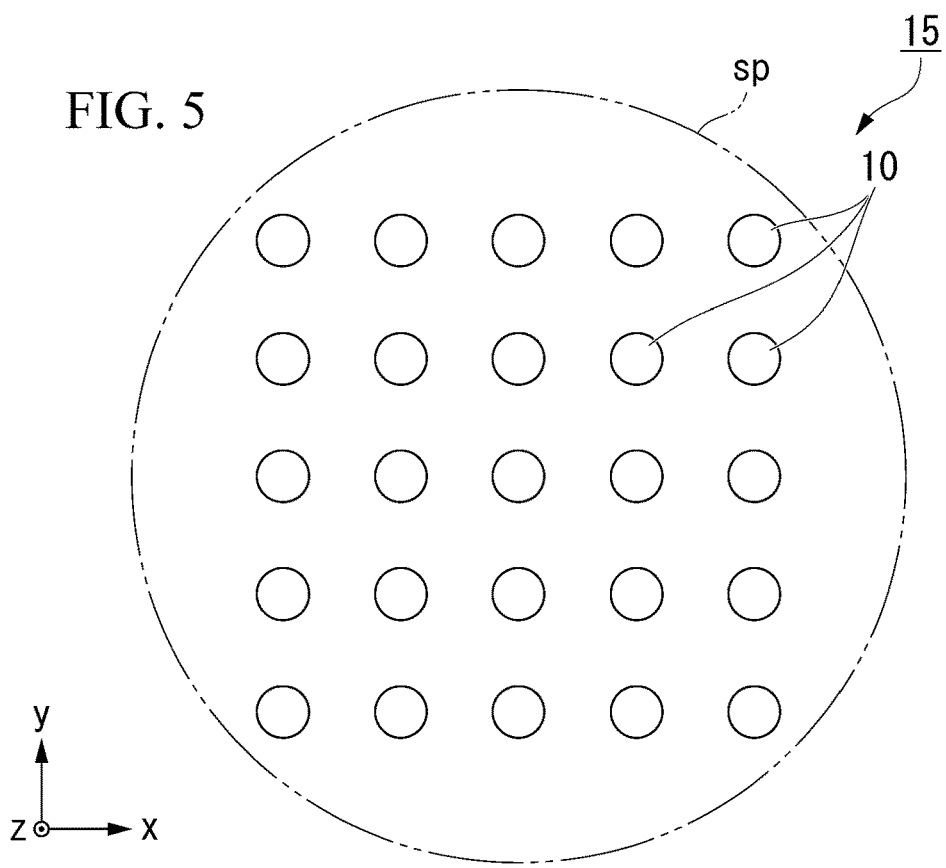
FIG. 5 is a plan view of a receiving device according to the first embodiment.

FIG. 5 is a plan view of the receiving device 15 according to the first embodiment when viewed from the z direction. The receiving device 15 converts a state of applied light or a change in the state into an electrical signal. The receiving device 15 has, for example, a plurality of magnetic elements 10. Within a spot sp of the applied light, the plurality of magnetic elements 10 may be arranged as shown in FIG. 5 or only one magnetic element 10 may be arranged.

The light applied to the receiving device 15 is not limited to visible light and also includes infrared light having a longer wavelength than the visible light and ultraviolet light having a shorter wavelength than the visible light. The wavelength of the visible light is, for example, 380 nm or more and less than 800 nm. The wavelength of the infrared light is, for example, 800 nm or more and 1 mm or less. The wavelength of the ultraviolet light is, for example, 200 nm or more and less than 380 nm. The light applied to the receiving device 15 is, for example, light which includes a high-frequency optical signal and whose intensity changes. The high-frequency optical signal is, for example, a signal having a frequency of 100 MHz or more.

Figure 6:
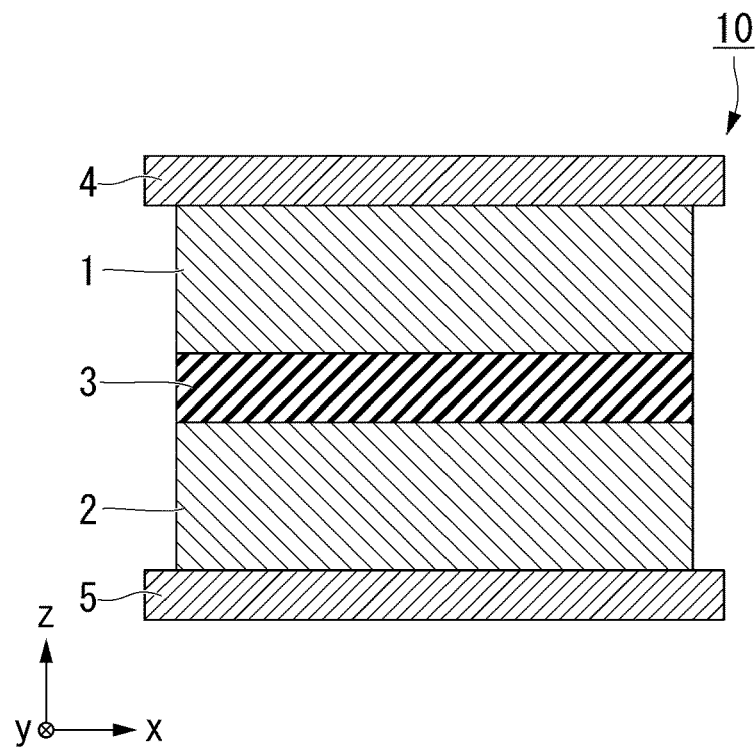
FIG. 6 is a cross-sectional view of a magnetic element according to the first embodiment.

When the state of light applied to each of the magnetic elements 10 changes, the voltage output from each of the magnetic elements 10 (a potential difference between the ends of each magnetic element in the z direction) varies with the change in the state of light. FIG. 6 is a cross-sectional view of the magnetic element 10 according to the first embodiment. The magnetic element 10 has, for example, a first ferromagnetic layer 1, a second ferromagnetic layer 2, a spacer layer 3, a first electrode 4, and a second electrode 5. The spacer layer 3 is positioned between the first ferromagnetic layer 1 and the second ferromagnetic layer 2. The magnetic element 10 may have another layer in addition to the above. The magnetic element 10 is irradiated with light from the first ferromagnetic layer 1 side.

The magnetic element 10 is, for example, a magnetic tunnel junction (MTJ) element in which the spacer layer 3 is made of an insulating material. In this case, the magnetic element 10 is an element in which a resistance value in the z direction (a resistance value when a current flows in the z direction) changes in accordance with relative changes in a magnetization state of the first ferromagnetic layer 1 and a magnetization state of the second ferromagnetic layer 2. The above element is also called a magnetoresistance effect element.

The first ferromagnetic layer 1 is a photodetection layer whose magnetization state changes when light is applied from the outside. The first ferromagnetic layer 1 is also called a magnetization free layer. The magnetization free layer is a layer including a magnet whose magnetization state changes when a prescribed external force has been applied. The prescribed external force is, for example, light applied from the outside, a current flowing through the magnetic element 10 in the z direction, or an external magnetic field. A state of the magnetization of the first ferromagnetic layer 1 varies with an intensity of light applied to the first ferromagnetic layer 1. Because a direction of the magnetization of a ferromagnet can vary with a high-speed change in the intensity of light applied to the ferromagnet (a high-frequency optical signal), the receiving device 15 can convert a high-frequency optical signal into an electrical signal using the first ferromagnetic layer 1 as a photodetection layer and high-speed optical communication becomes possible.

The first ferromagnetic layer 1 includes a ferromagnet. In the present specification, ferromagnetism includes ferrimagnetism. The first ferromagnetic layer 1 includes at least one of magnetic elements such as Co, Fe, and Ni. The first ferromagnetic layer 1 may include nonmagnetic elements such as B, Mg, Hf, and Gd in addition to the above-described magnetic elements. The first ferromagnetic layer 1 may be, for example, an alloy including a magnetic element and a nonmagnetic element. The first ferromagnetic layer 1 may include a plurality of layers. The first ferromagnetic layer 1 is, for example, a CoFeB alloy, a laminate in which a CoFeB alloy layer is sandwiched between Fe layers, or a laminate in which a CoFeB alloy layer is sandwiched between CoFe layers.

The first ferromagnetic layer 1 may be a perpendicular magnetization film having an axis of easy magnetization in a direction (the z direction) perpendicular to a film surface even if an in-plane magnetized film has an axis of easy magnetization in an in-plane direction (any direction within an xy plane).

A thickness of the first ferromagnetic layer 1 is, for example, 1 nm or more and 5 nm or less. A thickness of the first ferromagnetic layer 1 may be, for example, 1 nm or more and 2 nm or less. When the first ferromagnetic layer 1 is a perpendicular magnetization film, the effect of applying perpendicular magnetic anisotropy from the layers above and below the first ferromagnetic layer 1 is strengthened and the perpendicular magnetic anisotropy of the ferromagnetic layer 1 is increased if the thickness of the first ferromagnetic layer 1 is thin. That is, when the perpendicular magnetic anisotropy of the first ferromagnetic layer 1 is high, the force for the magnetization to return in the z direction is strengthened. On the other hand, when the thickness of the first ferromagnetic layer 1 is thick, the effect of applying the perpendicular magnetic anisotropy from the layers above and below the first ferromagnetic layer 1 is relatively weakened, and the perpendicular magnetic anisotropy of the first ferromagnetic layer 1 is weakened.

A volume of a ferromagnet becomes small when the thickness of the first ferromagnetic layer 1 becomes thin and the volume of the ferromagnet becomes large when the thickness of the first ferromagnetic layer 1 becomes thick. The susceptibility of the magnetization of the first ferromagnetic layer 1 when external energy has been applied is inversely proportional to a product (KuV) of the magnetic anisotropy (Ku) and the volume (V) of the first ferromagnetic layer 1. That is, when the product of the magnetic anisotropy of the first ferromagnetic layer 1 and the volume becomes small, the reactivity to light increases. From this point of view, in order to enhance the reaction to light, the magnetic anisotropy of the first ferromagnetic layer 1 may be appropriately designed and then the volume of the first ferromagnetic layer 1 may be reduced.

When the thickness of the first ferromagnetic layer 1 is thicker than 2 nm, an insertion layer made of, for example, Mo and W may be provided within the first ferromagnetic layer 1. That is, the first ferromagnetic layer 1 may be a laminate in which the ferromagnetic layer, the insertion layer, and the ferromagnetic layer are laminated in that order in the z direction. Interfacial magnetic anisotropy at an interface between the insertion layer and the ferromagnetic layer enhances the perpendicular magnetic anisotropy of the entire first ferromagnetic layer 1. A thickness of the insertion layer is, for example, 0.1 nm to 0.6 nm.

The second ferromagnetic layer 2 is a magnetization fixed layer. The magnetization fixed layer is a layer made of a magnet whose magnetization state is less likely to change than that of the magnetization free layer when prescribed external energy has been applied. For example, in the magnetization fixed layer, a direction of magnetization is less likely to change than that in the magnetization free layer when prescribed external energy has been applied. Also, for example, in the magnetization fixed layer, a magnitude of magnetization is less likely to change than that in the magnetization free layer when prescribed external energy is applied. For example, coercivity of the second ferromagnetic layer 2 is greater than that of the first ferromagnetic layer 1. The second ferromagnetic layer 2 has, for example, an axis of easy magnetization in the same direction as the first ferromagnetic layer 1. The second ferromagnetic layer 2 may be either an in-plane magnetization film or a perpendicular magnetization film.

For example, the material constituting the second ferromagnetic layer 2 is similar to that of the first ferromagnetic layer 1. The second ferromagnetic layer 2 may be, for example, a laminate in which Co having a thickness of 0.4 nm to 1.0 nm, Mo having a thickness of 0.1 nm to 0.5 nm, a CoFeB alloy having a thickness of 0.3 nm to 1.0 nm, and Fe having a thickness of 0.3 nm to 1.0 nm are laminated in that order.

The magnetization of the second ferromagnetic layer 2 may be fixed by, for example, magnetic coupling to the third ferromagnetic layer via a magnetic coupling layer. In this case, a combination of the second ferromagnetic layer 2, the magnetic coupling layer, and the third ferromagnetic layer may be called a magnetization fixed layer.

The third ferromagnetic layer is magnetically coupled to, for example, the second ferromagnetic layer 2. The magnetic coupling is, for example, antiferromagnetic coupling and is caused by Ruderman-Kittel-Kasuya-Yosida (RKKY) interaction. The material constituting the third ferromagnetic layer is, for example, similar to that of the first ferromagnetic layer 1. The magnetic coupling layer is, for example, Ru, Ir, or the like.

The spacer layer 3 is a nonmagnetic layer arranged between the first ferromagnetic layer 1 and the second ferromagnetic layer 2. The spacer layer 3 includes a layer made of a conductor, an insulator, or a semiconductor or a layer including a current carrying point formed of a conductor within an insulator. A thickness of the spacer layer 3 can be adjusted in accordance with orientation directions of the magnetization of the first ferromagnetic layer 1 and the magnetization of the second ferromagnetic layer 2 in an initial state to be described below.

For example, when the spacer layer 3 is made of an insulator, the magnetic element 10 has a magnetic tunnel junction (MTJ) including the first ferromagnetic layer 1, the spacer layer 3, and the second ferromagnetic layer 2. Such an element is called an MTJ element. In this case, the magnetic element 10 can exhibit a tunnel magnetoresistance (TMR) effect. For example, when the spacer layer 3 is made of a metal, the magnetic element 10 can exhibit a giant magnetoresistance (GMR) effect. Such an element is called a GMR element. The magnetic element 10 may be called the MTJ element, the GMR element, or the like, which differs according to the constituent material of the spacer layer 3, but they may also be collectively called magnetoresistance effect elements.

When the spacer layer 3 is made of an insulating material, materials including aluminum oxide, magnesium oxide, titanium oxide, silicon oxide, and the like can be used. Also, the above insulating materials may include elements such as Al, B, Si, and Mg and magnetic elements such as Co, Fe, and Ni. A high magnetoresistance change rate can be obtained by adjusting the thickness of the spacer layer 3 so that a strong TMR effect is exhibited between the first ferromagnetic layer 1 and the second ferromagnetic layer 2. In order to use the TMR effect efficiently, the thickness of the spacer layer 3 may be about 0.5 to 5.0 nm or about 1.0 to 2.5 nm.

When the spacer layer 3 is made of a nonmagnetic conductive material, a conductive material such as Cu, Ag, Au, or Ru can be used. In order to use the GMR effect efficiently, the thickness of the spacer layer 3 may be about 0.5 to 5.0 nm or about 2.0 to 3.0 nm.

When the spacer layer 3 is made of a nonmagnetic semiconductor material, a material such as zinc oxide, indium oxide, tin oxide, germanium oxide, gallium oxide, or indium tin oxide (ITO) can be used. In this case, the thickness of the spacer layer 3 may be about 1.0 to 4.0 nm.

When a layer including a current carrying point made of a conductor within a nonmagnetic insulator is applied as the spacer layer 3, a structure may be formed to include a current carrying point made of a nonmagnetic conductor of Cu, Au, Al, or the like within the nonmagnetic insulator made of aluminum oxide or magnesium oxide. Also, the conductor may be made of a magnetic element such as Co, Fe, or Ni. In this case, the thickness of the spacer layer 3 may be about 1.0 to 2.5 nm. The current carrying point is, for example, a columnar body having a diameter of 1 nm or more and 5 nm or less when viewed from a direction perpendicular to a film surface.

The magnetic element 10 may also have a base layer, a cap layer, a perpendicular magnetization inducing layer, and the like. The base layer is on the lower side of the second ferromagnetic layer 2. The base layer is a seed layer or a buffer layer. The seed layer enhances the crystallinity of the layer laminated on the seed layer. The seed layer is, for example, Pt, Ru, Hf, Zr, or NiFeCr. A thickness of the seed layer is, for example, 1 nm or more and 5 nm or less. The buffer layer is a layer that alleviates lattice mismatch between different crystals. The buffer layer is, for example, Ta, Ti, W, Zr, Hf, or a nitride of these elements. A thickness of the buffer layer is, for example, 1 nm or more and 5 nm or less.

The cap layer is on the upper side of the first ferromagnetic layer 1. The cap layer prevents damage to the lower layer during the process and enhances the crystallinity of the lower layer during annealing. The thickness of the cap layer is, for example, 3 nm or less so that the first ferromagnetic layer 1 is irradiated with sufficient light. The cap layer is, for example, MgO, W, Mo, Ru, Ta, Cu, Cr, or a laminated film thereof.

A perpendicular magnetization inducing layer is formed when the first ferromagnetic layer 1 is a perpendicular magnetization film. The perpendicular magnetization inducing layer is laminated on the first ferromagnetic layer 1. The perpendicular magnetization inducing layer induces perpendicular magnetic anisotropy of the first ferromagnetic layer 1. The perpendicular magnetization inducing layer is, for example, magnesium oxide, W, Ta, Mo, or the like. When the perpendicular magnetization inducing layer is magnesium oxide, magnesium oxide may be oxygen-deficient to increase conductivity. A thickness of the perpendicular magnetization inducing layer is, for example, 0.5 nm or more and 2.0 nm or less.

A first electrode 4 is in contact with, for example, the surface of the first ferromagnetic layer 1 opposite to the spacer layer 3. A second electrode 5 is in contact with, for example, the surface of the second ferromagnetic layer 2 opposite to the spacer layer 3. The first electrode 4 and the second electrode 5 sandwich the first ferromagnetic layer 1, the second ferromagnetic layer 2, and the spacer layer 3 in the z direction.

The first electrode 4 and the second electrode 5 are made of a conductive material. The first electrode 4 and the second electrode 5 are made of, for example, metals such as Cu, Al, Au, and Ru. Ta and/or Ti may be laminated on the top and bottom of the above metals. Also, as the first electrode 4 and the second electrode 5, a laminated film of Cu and Ta, a laminated film of Ta, Cu, and Ti, and a laminated film of Ta, Cu, and TaN may be used. Also, TiN and/or TaN may be used as the first electrode and the second electrode.

The first electrode 4 and the second electrode 5 may have transparency with respect to a wavelength range of light applied to the first ferromagnetic layer 1. For example, the first electrode 4 and the second electrode 5 may be transparent electrodes including transparent electrode materials of oxides such as indium tin oxide (ITO), indium zinc oxide (IZO), zinc oxide (ZnO), and indium gallium zinc oxide (IGZO). Also, the first electrode 4 and the second electrode 5 may have a configuration in which a plurality of columnar metals are contained in these transparent electrode materials.

The magnetic element 10 is manufactured, for example, by a laminating step, an annealing step, and a processing step for each layer. Each layer is formed by, for example, sputtering. Annealing is performed, for example, at 250° C. or higher and 450° C. or lower. A laminated film is processed using, for example, photolithography and etching. The laminated film is a columnar magnetic element 10. The magnetic element 10 may be a cylindrical element or a prismatic element. For example, the shortest width of the magnetic element 10 when viewed from the z direction may be 10 nm or more and 2000 nm or less or 30 nm or more and 500 nm or less. In the above steps, the magnetic element 10 is obtained.

The magnetic element 10 can be manufactured regardless of the material constituting the base. Thus, the receiving device 15 can be directly manufactured on the circuit chip 35 without involving the adhesive layer 70 or the like.

FIG. 6 shows an example of the magnetic element 10. It is only necessary for the magnetic element to have a ferromagnet whose magnetization state varies with radiation of light and have a resistance value that changes as the magnetization state changes. For example, an anisotropic magnetoresistance (AMR) effect element, a colossal magnetoresistance (CMR) effect element, and the like in addition to the above-mentioned tunnel magnetoresistance effect element or giant magnetoresistance effect element can be used for the magnetic element.

Next, some examples of the operation of the magnetic element 10 will be described. The first ferromagnetic layer 1 is irradiated with light whose light intensity changes. The resistance value of the magnetic element 10 in the z direction changes when the first ferromagnetic layer 1 is irradiated with light. An output voltage from the magnetic element 10 changes when the first ferromagnetic layer 1 is irradiated with light. In the first operation example, the case where the intensities of the light applied to the first ferromagnetic layer 1 are two levels of a first intensity and a second intensity will be described. The intensity of light of the second intensity is set to be greater than the intensity of light of the first intensity. The first intensity may correspond to the case where the intensity of light applied to the first ferromagnetic layer 1 is zero.

Figure 7:
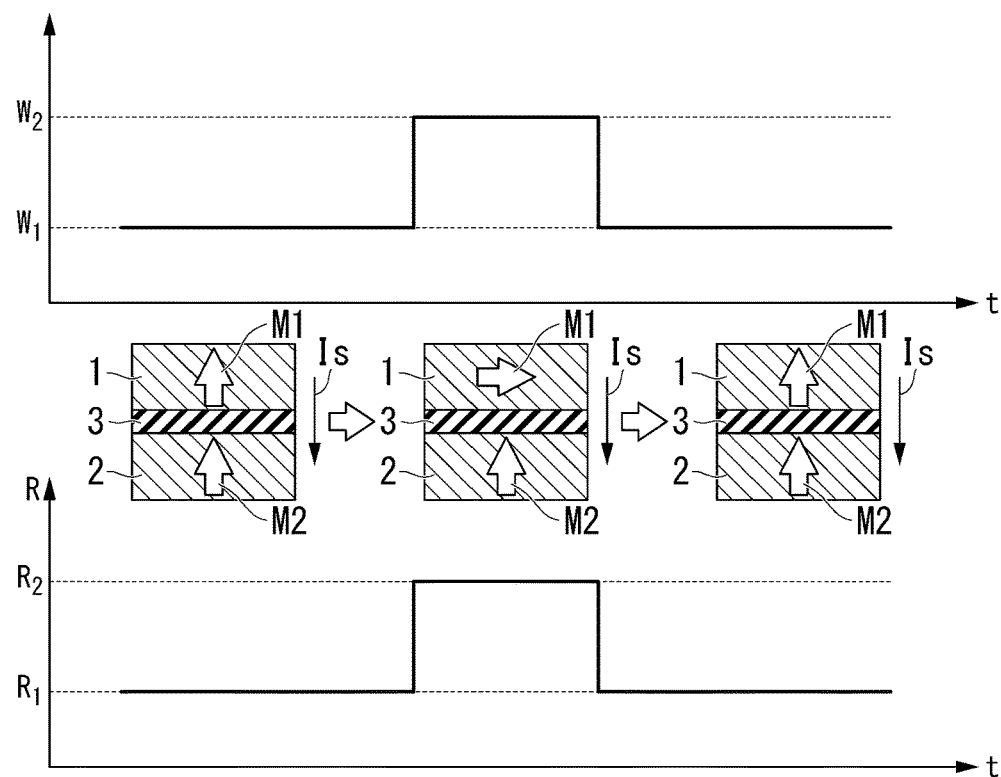
FIG. 7 is a diagram for describing a first mechanism of a first operation example of the magnetic element according to the first embodiment.
Figure 8:
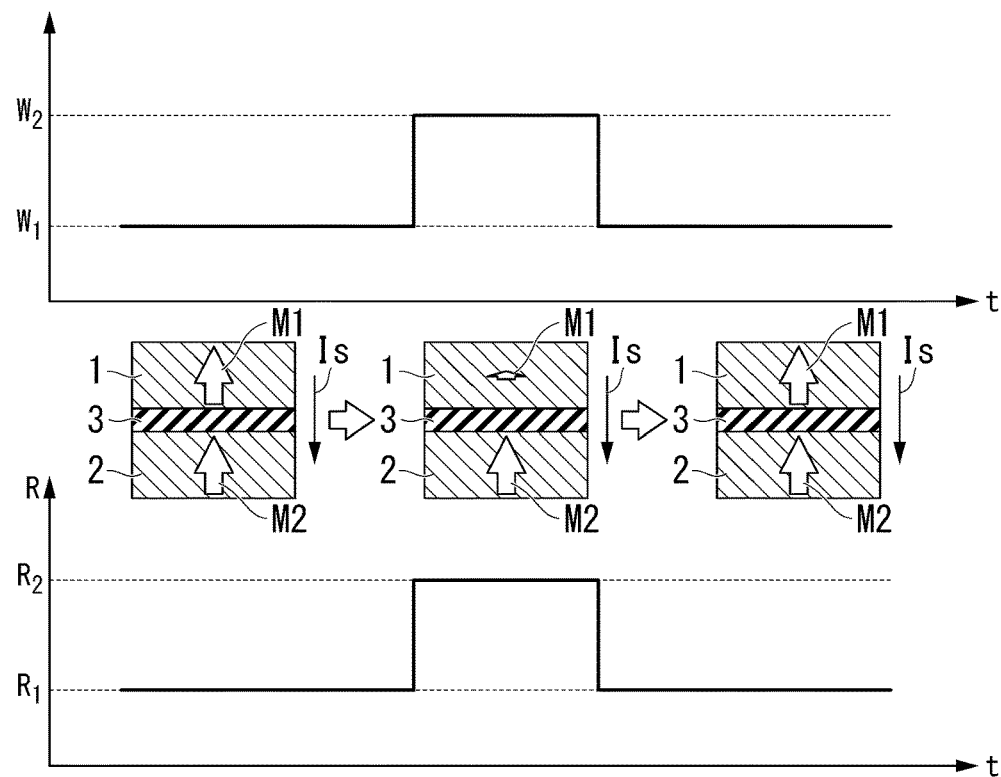
FIG. 8 is a diagram for describing a second mechanism of the first operation example of the magnetic element according to the first embodiment.

FIGS. 7 and 8 are diagrams for describing a first operation example of the magnetic element 10 according to the first embodiment. FIG. 7 is a diagram for describing a first mechanism of the first operation example and FIG. 8 is a diagram for describing a second mechanism of the first operation example. In the upper graphs of FIGS. 7 and 8, the vertical axis represents an intensity of light with which the first ferromagnetic layer 1 is irradiated and the horizontal axis represents time. In the lower graphs of FIGS. 7 and 8, the vertical axis represents a resistance value of the magnetic element 10 in the z direction and the horizontal axis represents time.

First, in a state in which the first ferromagnetic layer 1 is irradiated with light of the first intensity (hereinafter called an initial state), magnetization M1 of the first ferromagnetic layer 1 is parallel to magnetization M2 of the second ferromagnetic layer 2 and a resistance value of the magnetic element 10 in the z direction is a first resistance value $R_1$. The resistance value of the magnetic element 10 in the z direction is obtained by causing a sense current is to flow through the magnetic element 10 in the z direction to generate a voltage across both ends of the magnetic element 10 and using Ohm's law from a voltage value. An output voltage from the magnetic element 10 is generated between the first electrode 4 and the second electrode 5. In the case of the example shown in FIG. 7, the sense current Is flows in a direction from the first ferromagnetic layer 1 to the second ferromagnetic layer 2. By causing the sense current Is to flow in the above direction, a spin transfer torque in a direction, which is the same as that of the magnetization M2 of the second ferromagnetic layer 2, acts on the magnetization M1 of the first ferromagnetic layer 1, and the magnetization M1 becomes parallel to the magnetization M2 in the initial state. Also, by causing the sense current Is to flow in the above direction, it is possible to prevent the magnetization M1 of the first ferromagnetic layer 1 from being inverted during operation.

Next, the intensity of the light applied to the first ferromagnetic layer 1 changes from the first intensity to the second intensity. The second intensity is greater than the first intensity and the magnetization M1 of the first ferromagnetic layer 1 changes from the initial state. The state of the magnetization M1 of the first ferromagnetic layer 1 in the state in which the first ferromagnetic layer 1 is not irradiated with light is different from the state of the magnetization M1 of the first ferromagnetic layer 1 in the second intensity. The state of the magnetization M1 is, for example, a tilt angle with respect to the z direction, a magnitude, or the like.

For example, as shown in FIG. 7, when the intensity of the light applied to the first ferromagnetic layer 1 changes from the first intensity to the second intensity, the magnetization M1 is tilted in the z direction. Also, for example, as shown in FIG. 8, when the intensity of the light applied to the first ferromagnetic layer 1 changes from the first intensity to the second intensity, the magnitude of the magnetization M1 becomes small. For example, when the magnetization M1 of the first ferromagnetic layer 1 is tilted in the z direction due to the irradiation intensity of light, a tilt angle is larger than 0° and smaller than 90°.

When the magnetization M1 of the first ferromagnetic layer 1 changes from the initial state, the resistance value of the magnetic element 10 in the z direction is a second resistance value $R_2$. The second resistance value $R_2$ is larger than the first resistance value $R_1$. The second resistance value $R_2$ is between a resistance value when the magnetization M1 is parallel to the magnetization M2 (the first resistance value $R_1$) and a resistance value when the magnetization M1 is antiparallel to the magnetization M2.

In the case shown in FIG. 7, a spin transfer torque in a direction, which is the same as that of the magnetization M2 of the second ferromagnetic layer 2, acts on the magnetization M1 of the first ferromagnetic layer 1. Therefore, the magnetization M1 tries to return to a state in which the magnetization M1 is parallel to the magnetization M2 and the magnetic element 10 returns to the initial state when the intensity of the light applied to the first ferromagnetic layer 1 changes from the second intensity to the first intensity. In the case shown in FIG. 8, when the intensity of the light applied to the first ferromagnetic layer 1 returns to the first intensity, the magnitude of the magnetization M1 of the first ferromagnetic layer 1 returns to the original magnitude and the magnetic element 10 returns to the initial state. In either case, the resistance value of the magnetic element 10 in the z direction returns to the first resistance value $R_1$. That is, when the intensity of the light applied to the first ferromagnetic layer 1 changes from the second intensity to the first intensity, the resistance value of the magnetic element 10 in the z direction changes from the second resistance value $R_2$ to the first resistance value $R_1$.

The resistance value of the magnetic element 10 in the z direction changes in correspondence with a change in the intensity of the light applied to the first ferromagnetic layer 1. The output voltage from the magnetic element 10 changes in correspondence with a change in the intensity of the light applied to the first ferromagnetic layer 1. That is, the magnetic element 10 can convert a change in the intensity of the applied light into a change in the output voltage. That is, the magnetic element 10 can convert the received optical signal into an electrical signal. The output voltage from the magnetic element 10 is sent to the integrated circuit 36 and, for example, the integrated circuit 36 processes the signal when the output voltage from the magnetic element 10 is greater than or equal to a threshold value as a first signal (for example, "1") and processes the signal when the output voltage from the magnetic element 10 is less than the threshold value as a second signal (for example, "0").

Although the case where the magnetization M1 is parallel to the magnetization M2 in the initial state has been described as an example here, the magnetization M1 may be antiparallel to the magnetization M2 in the initial state. In this case, the resistance value of the magnetic element 10 in the z direction decreases as the state of the magnetization M1 changes (for example, as the change in the angle of the magnetization M1 increases from the initial state). When the initial state is the case where the magnetization M1 is antiparallel to the magnetization M2, that the sense current Is may flow in a direction from the second ferromagnetic layer 2 to the first ferromagnetic layer 1. By causing the sense current Is to flow in the above direction, a spin transfer torque in a direction opposite to that of the magnetization M2 of the second ferromagnetic layer 2 acts on the magnetization M1 of the first ferromagnetic layer 1 and the magnetization M1 becomes antiparallel to the magnetization M2 in the initial state.

In the first operation example, the case where the light applied to the first ferromagnetic layer 1 has two levels of the first intensity and the second intensity has been described as an example, but in the second operation example, the case where the intensity of the light applied to the first ferromagnetic layer 1 changes at multiple levels or in an analog manner will be described.

Figure 9:
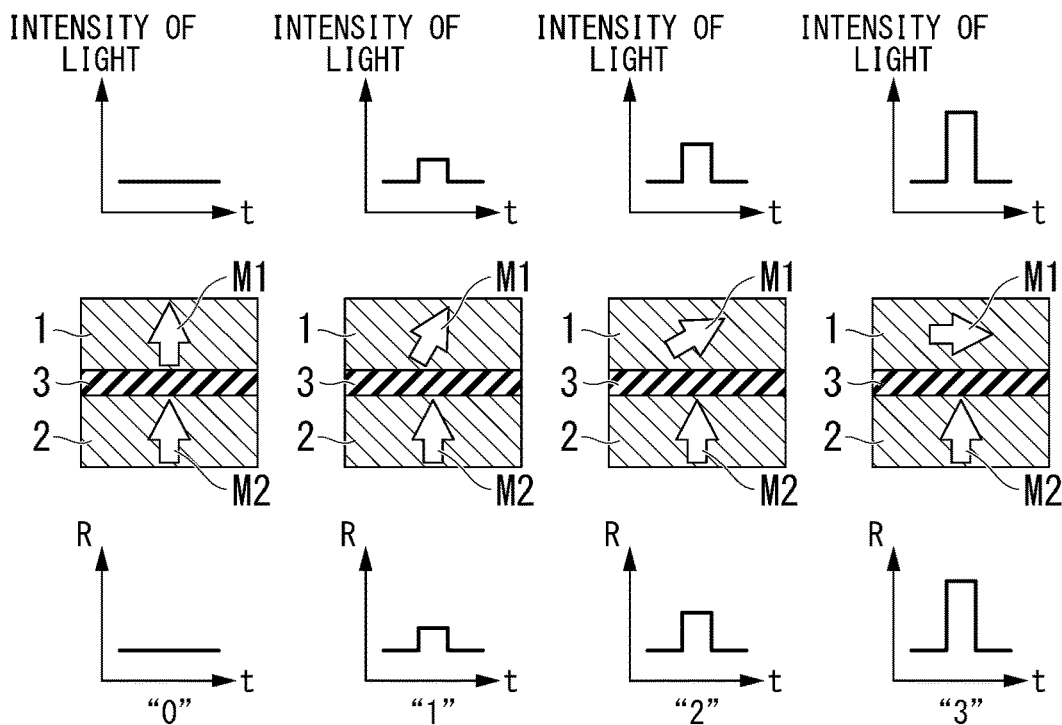
FIG. 9 is a diagram for describing a first mechanism of a second operation example of the magnetic element according to the first embodiment.
Figure 10:
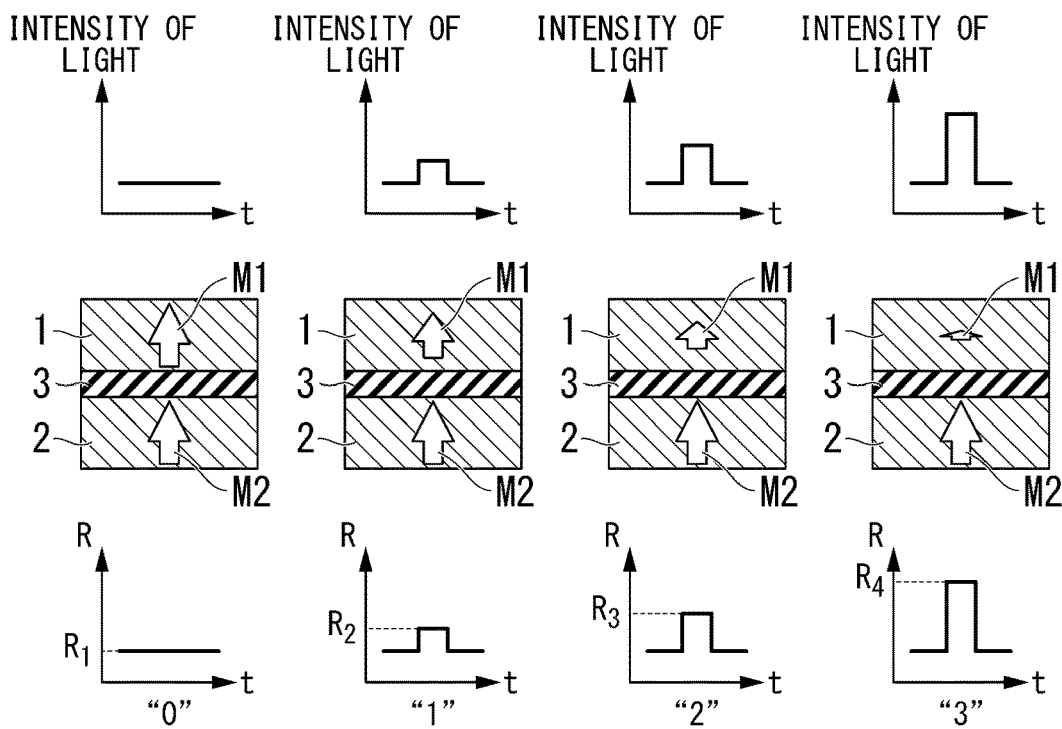
FIG. 10 is a diagram for describing a second mechanism of the second operation example of the magnetic element according to the first embodiment.

FIGS. 9 and 10 are diagrams for describing a second operation example of the magnetic element 10 according to the first embodiment. FIG. 9 is a diagram for describing a first mechanism of the second operation example and FIG. 10 is a diagram for describing a second mechanism of the second operation example. In the upper graphs of FIGS. 9 and 10, the vertical axis represents an intensity of light applied to the first ferromagnetic layer 1 and the horizontal axis represents time. In the lower graphs of FIGS. 9 and 10, the vertical axis represents a resistance value of the magnetic element 10 in the z direction and the horizontal axis represents time.

In the case of FIG. 9, when the intensity of the light applied to the first ferromagnetic layer 1 increases, the magnetization M1 of the first ferromagnetic layer 1 is tilted from the initial state due to external energy generated by the radiation of the light. An angle between the direction of the magnetization M1 of the first ferromagnetic layer 1 when the first ferromagnetic layer 1 is not irradiated with light and the direction of the magnetization M1 when the first ferromagnetic layer 1 is irradiated with light is greater than 0° and less than 90°.

When the magnetization M1 of the first ferromagnetic layer 1 is tilted from the initial state, the resistance value of the magnetic element 10 in the z direction changes. For example, the resistance value of the magnetic element 10 in the z direction changes to the second resistance value $R_2$, a third resistance value $R_3$, or a fourth resistance value $R_4$ in accordance with the tilt of the magnetization M1 of the first ferromagnetic layer 1. The resistance value increases in the order of the first resistance value $R_1$, the second resistance value $R_2$, the third resistance value $R_3$, and the fourth resistance value $R_4$. That is, the output voltage from the magnetic element 10 changes from a first voltage value to a second voltage value, a third voltage value, or a fourth voltage value in accordance with the tilt of the magnetization M1 of the first ferromagnetic layer 1. The output voltage increases in the order of the first voltage value, the second voltage value, the third voltage value, and the fourth voltage value.

The resistance value of the magnetic element 10 in the z direction changes when the intensity of the light applied to the first ferromagnetic layer 1 has changed. The output voltage from the magnetic element 10 changes when the intensity of the light applied to the first ferromagnetic layer 1 has changed. For example, if the first voltage value is defined as "0," the second voltage value is defined as "1," the third voltage value is defined as "2," and the fourth voltage value is defined as "3," the magnetic element 10 can output information about four values. Although the case where four values are read is shown as an example here, the number of values to be read can be freely designed by setting the threshold value of the output voltage. Also, the magnetic element 10 may output an analog value as it is.

Likewise, in the case of FIG. 10, when the intensity of the light applied to the first ferromagnetic layer 1 increases, the magnitude of the magnetization M1 of the first ferromagnetic layer 1 decreases from the initial state due to external energy generated by the radiation of the light. When the magnetization M1 of the first ferromagnetic layer 1 decreases from the initial state, the resistance value of the magnetic element 10 in the z direction changes. For example, the resistance value of the magnetic element 10 in the z direction changes to the second resistance value $R_2$, the third resistance value $R_3$, or the fourth resistance value $R_4$ in accordance with the magnitude of the magnetization M1 of the first ferromagnetic layer 1. That is, the output voltage from the magnetic element 10 changes from the first voltage value to the second voltage value, the third voltage value, or the fourth voltage value in accordance with the magnitude of the magnetization M1 of the first ferromagnetic layer 1. Therefore, as in the case of FIG. 9, the magnetic element 10 can output a difference between the above output voltages as multi-valued or analog data.

Also, in the case of the second operation example, as in the case of the first operation example, when the intensity of the light applied to the first ferromagnetic layer 1 returns to the first intensity, the magnetization M1 of the first ferromagnetic layer 1 returns to the original state and the magnetic element 10 returns to the initial state.

Although the case where the magnetization M1 is parallel to the magnetization M2 in the initial state has been described as an example here, the magnetization M1 may also be antiparallel to the magnetization M2 in the initial state in the second operation example.

Also, in the first operation example and the second operation example, the case where the magnetization M1 is parallel or antiparallel to the magnetization M2 in the initial state is exemplified, but the magnetization M1 may be orthogonal to the magnetization M2 in the initial state. For example, the above case corresponds to the case where the first ferromagnetic layer 1 is an in-plane magnetization film where the magnetization M1 is oriented in any direction of the xy plane and the second ferromagnetic layer 2 is a perpendicular magnetization film where the magnetization M2 is oriented in the z direction. The magnetization M1 is oriented in any direction within the xy plane due to magnetic anisotropy and the magnetization M2 is oriented in the z direction, so that the magnetization M1 is orthogonal to the magnetization M2 in the initial state.

Figure 11:
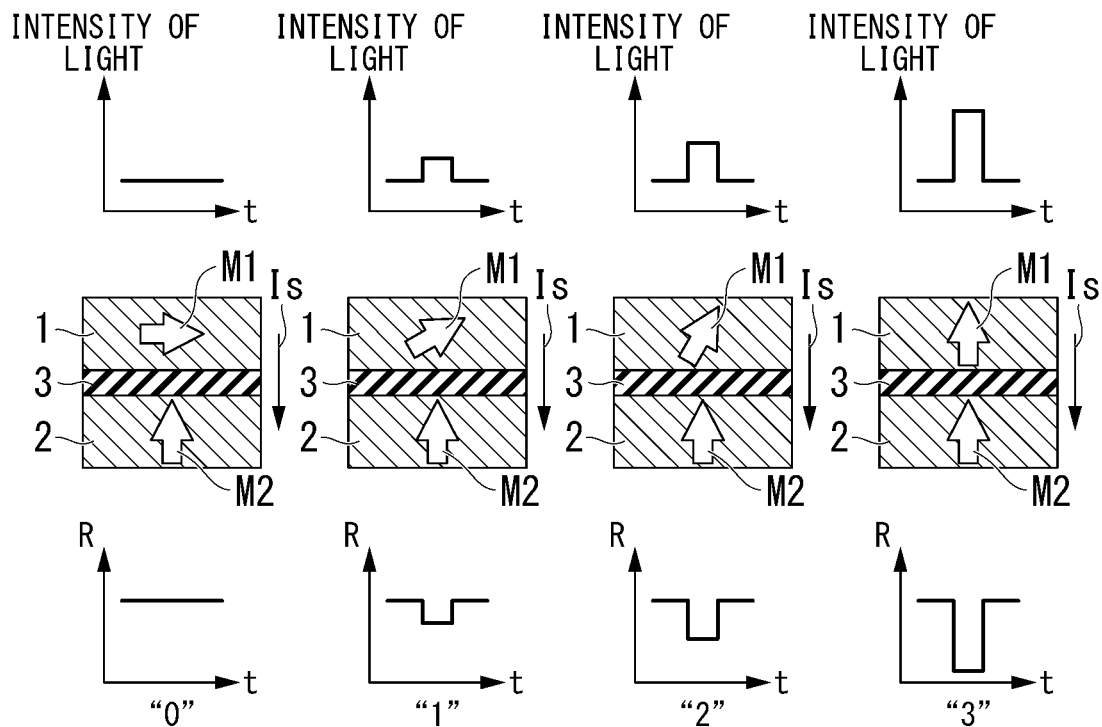
FIG. 11 is a diagram for describing another second operation example of the magnetic element according to the first embodiment.
Figure 12:
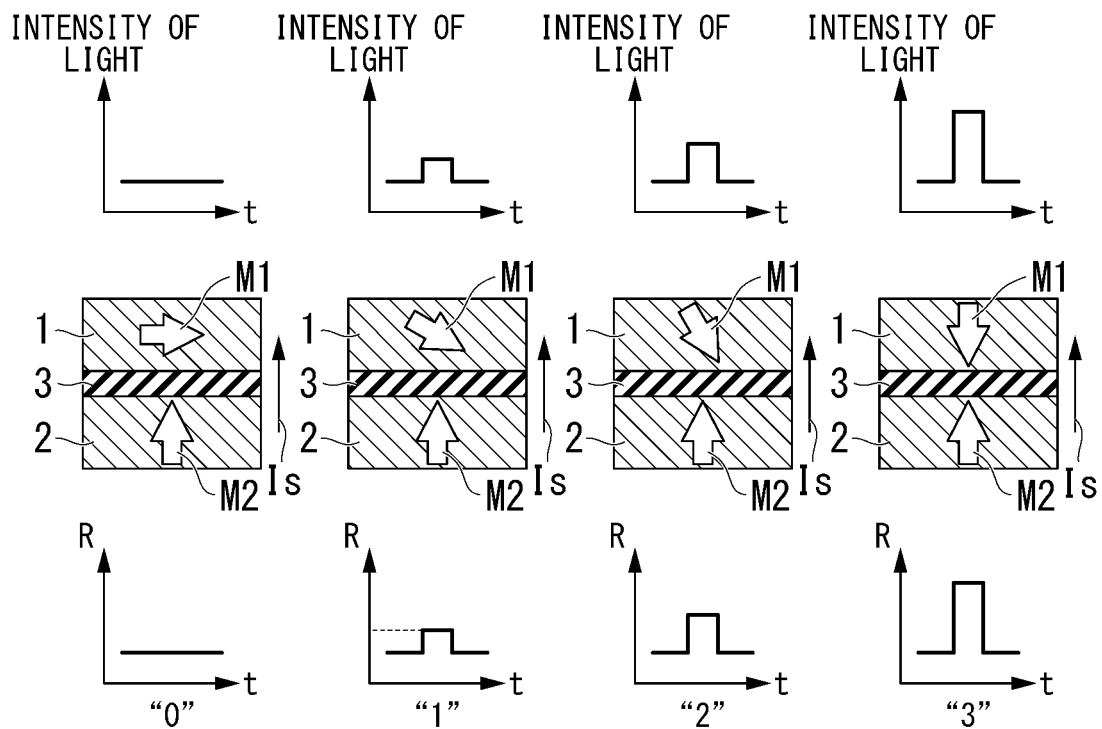
FIG. 12 is a diagram for describing another second operation example of the magnetic element according to the first embodiment.

FIGS. 11 and 12 are diagrams for describing another example of the second operation example of the magnetic element 10 according to the first embodiment. The flow direction of the sense current Is applied to the magnetic element 10 is different between FIGS. 11 and 12. In FIG. 11, the sense current Is flows from the first ferromagnetic layer 1 to the second ferromagnetic layer 2. In FIG. 12, the sense current Is flows from the second ferromagnetic layer 2 to the first ferromagnetic layer 1.

In both cases of FIGS. 11 and 12, a spin transfer torque acts on the magnetization M1 in the initial state due to the sense current Is flowing through the magnetic element 10. In the case of FIG. 11, the spin transfer torque acts so that the magnetization M1 is parallel to the magnetization M2 of the second ferromagnetic layer 2. In the case of FIG. 12, the spin transfer torque acts so that the magnetization M1 is antiparallel to the magnetization M2 of the second ferromagnetic layer 2. In both cases of FIGS. 11 and 12, the effect of magnetic anisotropy on the magnetization M1 is greater than the effect of the spin transfer torque in the initial state, so that the magnetization M1 is directed in any direction within the xy plane.

When the intensity of the light applied to the first ferromagnetic layer 1 increases, the magnetization M1 of the first ferromagnetic layer 1 is tilted from the initial state due to the external energy generated by the radiation of the light. This is because a sum of the effect of radiation of light applied to the magnetization M1 and the effect of the spin transfer torque is greater than the effect of magnetic anisotropy related to the magnetization M1. When the intensity of the light applied to the first ferromagnetic layer 1 increases, the magnetization M1 in the case of FIG. 11 tilts to be parallel to the magnetization M2 of the second ferromagnetic layer 2 and the magnetization M1 in the case of FIG. 12 tilts to be antiparallel to the magnetization M2 of the second ferromagnetic layer 2. Because the direction of the spin transfer torque acting on the magnetization M1 is different, the tilt directions of the magnetization M1 in FIGS. 11 and 12 are different.

When the intensity of the light applied to the first ferromagnetic layer 1 increases, the resistance value of the magnetic element 10 in the z direction decreases in the case of FIG. 11 and the resistance value of the magnetic element 10 in the z direction increases in the case of FIG. 12. That is, when the intensity of the light applied to the first ferromagnetic layer 1 increases, the output voltage from the magnetic element 10 decreases in the case of FIG. 11 and the output voltage of the magnetic element 10 increases in the case of FIG. 12.

When the intensity of the light applied to the first ferromagnetic layer 1 returns to the first intensity, the state of the magnetization M1 of the first ferromagnetic layer 1 returns to the original state due to the effect of magnetic anisotropy on the magnetization M1. As a result, the magnetic element 10 returns to the initial state.

Although the first ferromagnetic layer 1 is an in-plane magnetization film and the second ferromagnetic layer 2 is a perpendicular magnetization film here, a relationship therebetween may be reversed. That is, in the initial state, the magnetization M1 may be oriented in the z direction and the magnetization M2 may be oriented in any direction within the xy plane.

As described above, the receiving device 15 receives an optical signal and converts the received optical signal into an electrical signal by the magnetic element 10.

Figure 13:
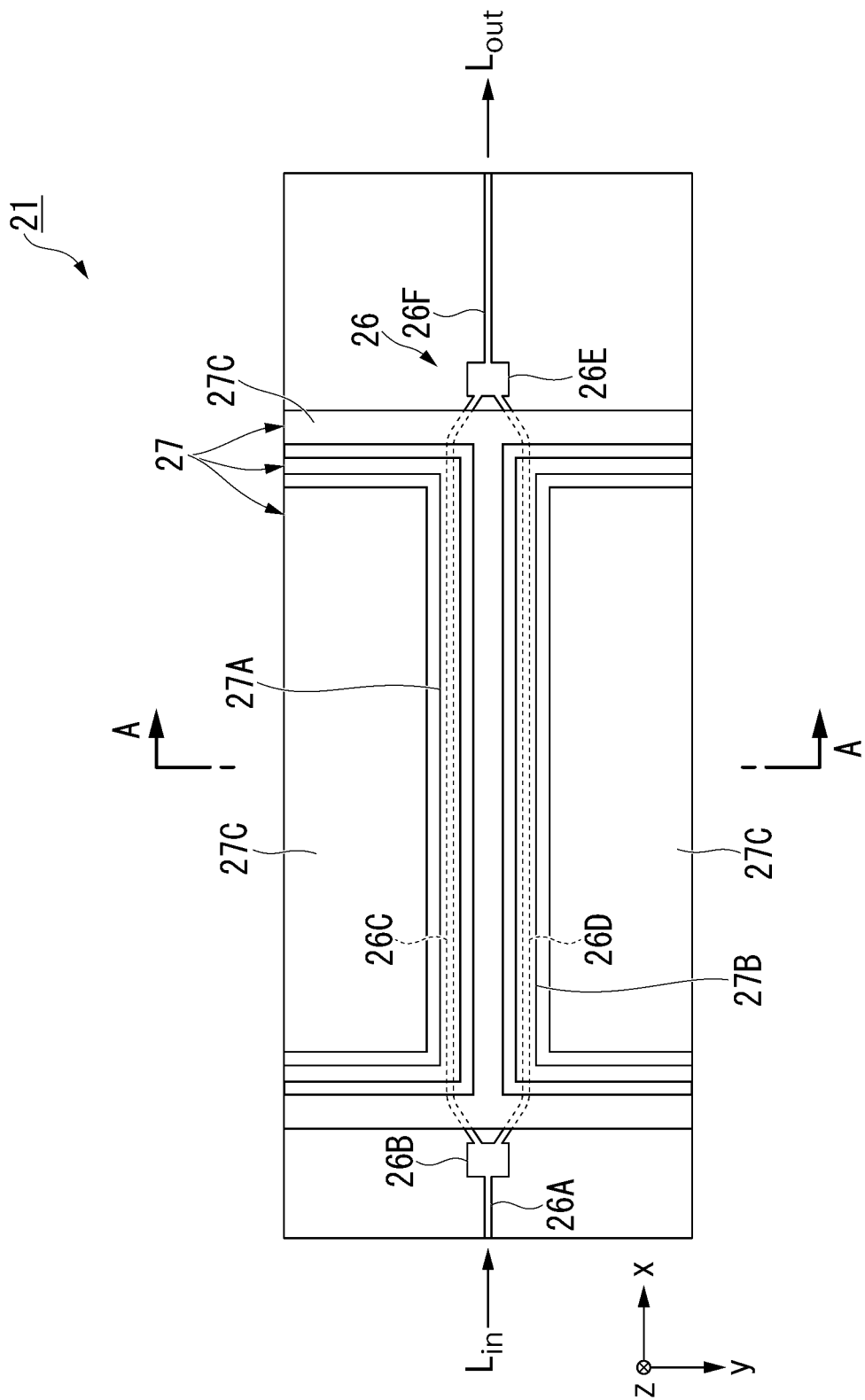
FIG. 13 is a plan view of an optical modulation element of the transmission device according to the first embodiment.
Figure 14:
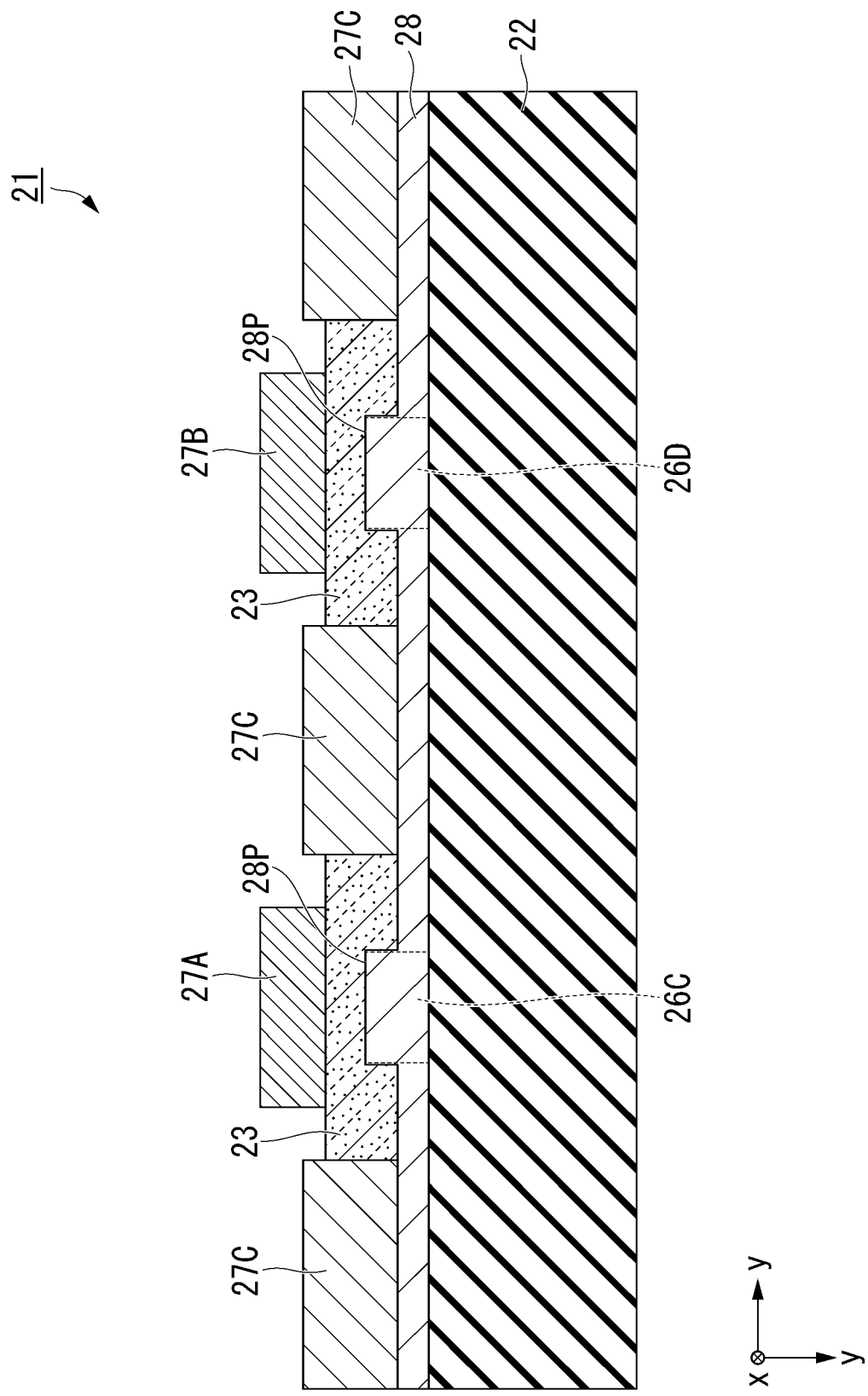
FIG. 14 is a cross-sectional view of the optical modulation element according to the first embodiment.

FIG. 13 is a plan view of the optical modulation element 21 of the transmission device 25 according to the first embodiment when viewed from the z direction. FIG. 14 is a cross-sectional view of the optical modulation element 21 according to the first embodiment. FIG. 14 is a cross section taken along the line A-A of FIG. 13. The optical modulation element 21 converts an electrical signal into an optical signal. The optical modulation element 21 is an example of a modulated light output element. The optical modulation element 21 shown in FIGS. 13 and 14 is an example of the optical modulation element and a configuration of the optical modulation element is not limited to the above example.

The optical modulation element 21 includes a substrate 22, a coating layer 23, a waveguide 26, and an electrode 27.

The substrate 22 includes, for example, aluminum oxide. The substrate 22 is, for example, sapphire. The coating layer 23 is, for example, $SiO_2$, $Al_2O_3$, $MgF_2$, $La_2O_3$, ZnO, $HfO_2$, MgO, $Y_2O_3$, $CaF_2$, $In_2O_3$, or a mixture thereof.

The waveguide 26 has, for example, an input waveguide 26A, a branch portion 26B, a first waveguide 26C, a second waveguide 26D, a coupling portion 26E, and an output waveguide 26F.

The input waveguide 26A has an input end to which input light $L_{in}$ is input and is connected to the branch portion 26B. The branch portion 26B is between the input waveguide 26A and the first waveguide 26C and the second waveguide 26D. The input light $L_{in}$ is input from the outside. The input light $L_{in}$ is, for example, laser light.

For example, the first waveguide 26C and the second waveguide 26D extend in the x direction. Lengths of the first waveguide 26C and the second waveguide 26D in the x direction are, for example, substantially the same.

The coupling portion 26E is positioned between the first waveguide 26C and the second waveguide 26D and the output waveguide 26F. The output waveguide 26F is connected to the coupling portion 26E and has an output end from which output light $L_{out}$ is output.

As shown in FIG. 14, the first waveguide 26C and the second waveguide 26D include a part of a slab 28 and a ridge-shaped portion 28P. The slab 28 spreads on the substrate 22. The ridge-shaped portion 28P projects from the upper surface of the slab 28. The slab 28 increases the strength of an electric field applied to the waveguide 26.

The slab 28 and the ridge-shaped portion 28P include lithium niobate as a main component. Therefore, the waveguide 26 includes lithium niobate as a main component. Some elements of lithium niobate may be replaced with other elements. The waveguide 26 is covered with, for example, the coating layer 23. The slab 28 and the ridge-shaped portion 28P may be made of materials other than lithium niobate. For example, the slab 28 and the ridge-shaped portion 28P may be silicon or silicon oxide to which germanium oxide is added and the coating layer 23 may be silicon oxide. The input waveguide 26A, the branch portion 26B, the coupling portion 26E, and the output waveguide 26F also have configurations similar to those of the first waveguide 26C and the second waveguide 26D.

The electrode 27 includes, for example, an electrode 27A, an electrode 27B, and an electrode 27C. The electrodes 27A and 27B are at positions where an electric field can be applied to at least a part of the waveguide 26. An electric field can be applied from the electrode 27A to the first waveguide 26C. An electric field can be applied from the electrode 27B to the second waveguide 26D. The electrode 27A is, for example, above the first waveguide 26C. The electrode 27B is, for example, above the second waveguide 26D. The electrode 27C is, for example, on the sides of the electrode 27A and the electrode 27B.

The electrodes 27A and 27B are connected to the integrated circuit 36 (the electronic component 32 or the wiring 33) of the circuit chip 35. The electrode 27C is connected to a reference potential. The reference potential is, for example, a ground potential.

A voltage is applied from the integrated circuit 36 to the electrode 27A. The integrated circuit 36 applies a modulated voltage to the electrode 27A. A voltage is applied from the integrated circuit 36 to the electrode 27B. The integrated circuit 36 applies a modulated voltage to the electrode 27B. The voltage applied to the electrode 27A and the voltage applied to the electrode 27B can be controlled individually.

Input light $L_{in}$ input from the input waveguide 26A branches into the first waveguide 26C and the second waveguide 26D and propagates. A phase difference between light propagating through the first waveguide 26C and light propagating through the second waveguide 26D is zero at the time of branching.

When a voltage is applied between the electrode 27A and the electrode 27C, an electric field is applied to the first waveguide 26C and a refractive index of the first waveguide changes due to an electro-optical effect. When a voltage is applied between the electrode 27B and the electrode 27C, an electric field is applied to the second waveguide 26D and a refractive index of the second waveguide 26D changes due to the electro-optical effect.

If the refractive indices of the first waveguide 26C and the second waveguide 26D are different, a phase difference occurs between the light propagating through the first waveguide 26C and the light propagating through the second waveguide 26D. The light propagating through the first waveguide 26C and the second waveguide 26D merges at the output waveguide 26F and is output from the optical modulation element 21 as output light $L_{out}$.

The output light $L_{out}$ is light obtained by superposing the light propagating through the first waveguide 26C onto the light propagating through the second waveguide 26D. An intensity of the output light $L_{out}$ varies with the phase difference between the light propagating through the first waveguide 26C and the light propagating through the second waveguide 26D. For example, when the phase difference is an even multiple of π, the above types of light strengthen each other and the intensity of the output light $L_{out}$ increases, and when the phase difference is an odd multiple of π, the above types of light weaken each other and the intensity of the output light $L_{out}$ decreases. Based on this principle, the optical modulation element 21 modulates the input light $L_{in}$ into the output light $L_{out}$ in accordance with the electrical signal from the integrated circuit 36. The transmission device 25 transmits the output light $L_{out}$ after the modulation by the optical modulation element 21 as an optical signal.

In the transceiver device 100 according to the first embodiment, the magnetic element 10 configured to convert a received optical signal into an electrical signal and the optical modulation element 21 configured to output an optical signal, which is modulated light, are electrically connected to the integrated circuit 36 configured to control the magnetic element 10 and the optical modulation element 21 and the magnetic element 10 and the optical modulation element 21 are arranged on the circuit chip 35 in the z direction. Thereby, the transceiver device 100 according to the first embodiment can be miniaturized. Also, the transceiver device 100 according to the first embodiment can be treated as one packaged electronic component and can be easily connected to another component such as the fiber 202.

Also, the magnetic element 10 can be manufactured regardless of the material constituting the base and can be manufactured on the circuit chip 35 without using the adhesive layer 70 or the like. Therefore, in the transceiver device 100 according to the first embodiment, the magnetic element 10 can be easily arranged on the circuit chip 35 in the z direction and the miniaturization can be easily performed.

Second Embodiment

Figure 15:
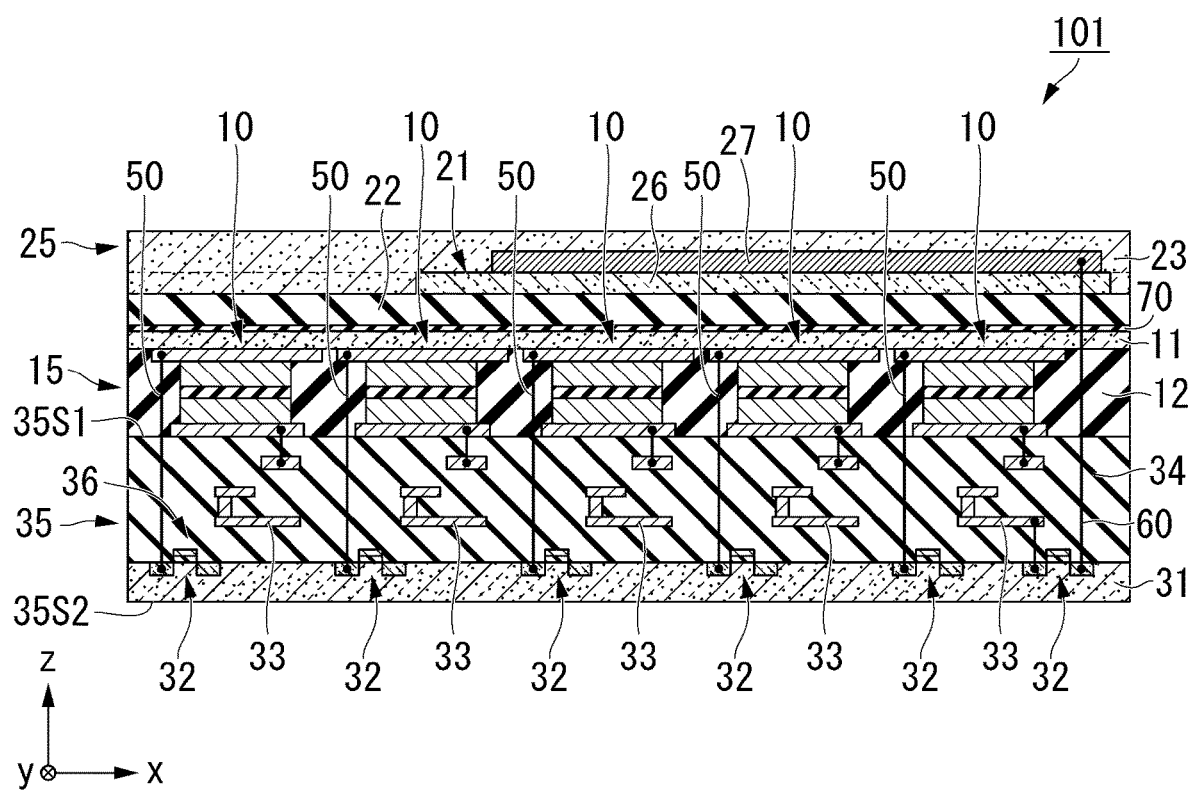
FIG. 15 is a cross-sectional view of a transceiver device according to a second embodiment.

FIG. 15 is a cross-sectional view of a transceiver device 101 according to a second embodiment. In the second embodiment, components similar to those in the first embodiment are designated by the same reference signs and the description thereof will be omitted.

The transceiver device 101 is different from the transceiver device 100 according to the first embodiment in the lamination order of a receiving device 15, a transmission device 25, and a circuit chip 35. In the transceiver device 101, lamination is achieved in the order of the circuit chip 35, the receiving device 15, and the transmission device 25. The receiving device 15 and the transmission device 25 are on a first surface 35S1 side of the circuit chip 35. A magnetic element 10 and an optical modulation element 21 are on the first surface 35S1 side of the circuit chip 35. The receiving device 15 is between the circuit chip 35 and the transmission device 25 in a z direction. A position of the magnetic element 10 in the z direction is between a position of the circuit chip 35 in the z direction and a position of the optical modulation element 21 in the z direction.

A waveguide 11 is on one surface of the receiving device 15. The waveguide 11 is, for example, between the receiving device 15 and the transmission device 25. One end of the waveguide 11 is in a traveling direction of light output from an end of a first fiber 130. The light including a signal output from the end of the first fiber 130 propagates through the waveguide 11 and is applied to the magnetic element 10.

The transmission device 25 is attached to the receiving device 15 by, for example, an adhesive layer 70. In the example shown in FIG. 15, a substrate 22 of the transmission device 25 is attached to the waveguide 11 side of the receiving device 15 via the adhesive layer 70. An integrated circuit 36 of the circuit chip 35 and the optical modulation element 21 of the transmission device 25 are electrically connected via through wiring 60. For example, the through wiring 60 passes through insulating layers (for example, the substrate 22 having insulating properties, the adhesive layer 70, an insulating layer 12 and an insulating layer 34) between the optical modulation element 21 and the integrated circuit 36 in the z direction. The through wiring 60 connects the optical modulation element 21 to the integrated circuit 36. The optical modulation element 21 and the integrated circuit 36 may be electrically connected to each other via a bump between the transmission device 25 and the circuit chip 35, as in the first embodiment. In this case, the bump between the transmission device 25 and the circuit chip 35 is provided between the transmission device 25 and the receiving device 15 sandwiching the adhesive layer 70.

The transceiver device 101 according to the second embodiment has effects similar to those of the transceiver device 100 according to the first embodiment.

Third Embodiment

Figure 16:
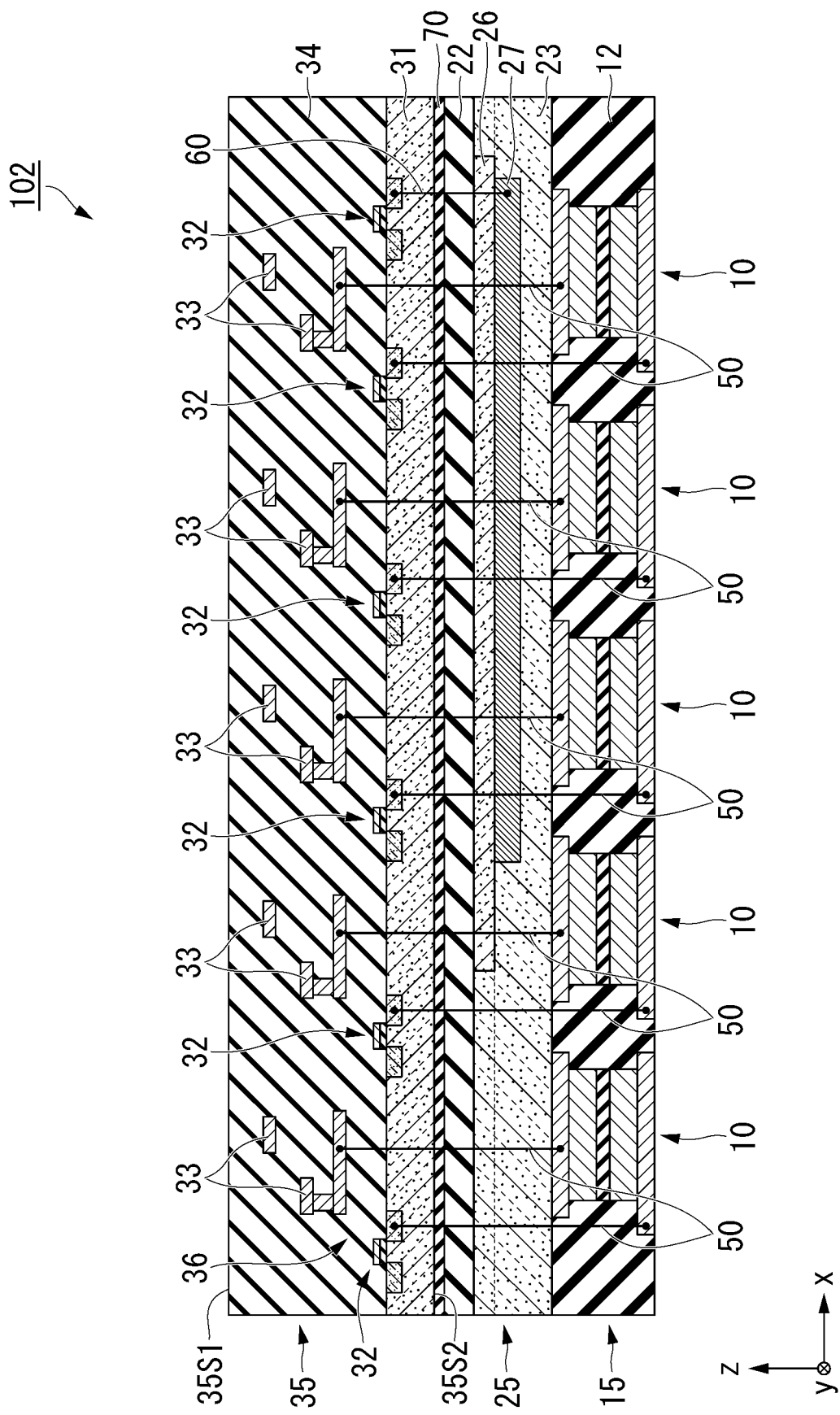
FIG. 16 is a cross-sectional view of a transceiver device according to a third embodiment.

FIG. 16 is a cross-sectional view of a transceiver device 102 according to a third embodiment. In the third embodiment, components similar to those in the first embodiment are designated by the same reference signs and the description thereof will be omitted.

The transceiver device 102 is different from the transceiver device 100 according to the first embodiment in the lamination order of a receiving device 15, a transmission device 25, and a circuit chip 35. In the transceiver device 102, lamination is achieved in the order of the circuit chip 35, the transmission device 25, and the receiving device 15. The receiving device 15 and the transmission device 25 are on a second surface 35S2 side of the circuit chip 35. A magnetic element 10 and an optical modulation element 21 are on the second surface 35S2 side of the circuit chip 35. The transmission device 25 is positioned between the circuit chip 35 and the receiving device 15 in a z direction. A position of the optical modulation element 21 in the z direction is between a position of the circuit chip 35 in the z direction and a position of the magnetic element 10 in the z direction.

The transmission device 25 is attached to the circuit chip 35 by, for example, an adhesive layer 70. In the example shown in FIG. 16, a substrate 22 of the transmission device 25 is attached to a substrate 31 of the circuit chip 35 via the adhesive layer 70. An integrated circuit 36 of the circuit chip 35 and the optical modulation element 21 of the transmission device 25 are electrically connected via through wiring 60. For example, the through wiring 60 passes through insulating layers (for example, the substrate 22 having insulating properties, the adhesive layer 70, and the insulating substrate 31 having insulating properties) between the optical modulation element 21 and the integrated circuit 36 in the z direction. The through wiring 60 connects the optical modulation element 21 and the integrated circuit 36. The optical modulation element 21 and the integrated circuit 36 may be electrically connected via a bump between the transmission device 25 and the circuit chip 35, as in the first embodiment. In this case, the bump between the transmission device 25 and the circuit chip 35 is provided between the substrate 22 and the substrate 31 sandwiching the adhesive layer 70.

For example, the magnetic element 10 is provided on a coating layer 23 of the transmission device 25. The integrated circuit 36 of the circuit chip 35 and the magnetic element 10 of the receiving device 15 are electrically connected via through wiring 50. For example, the through wiring 50 passes through insulating layers (for example, an insulating layer 12, the coating layer 23, the substrate 22, the adhesive layer 70, and an insulating layer 34) between the magnetic element 10 and the integrated circuit 36 in the z direction. The through wiring 50 connects the magnetic element 10 to the integrated circuit 36.

The transceiver device 102 according to the third embodiment has effects similar to those of the transceiver device 100 according to the first embodiment.

Fourth Embodiment

Figure 17:
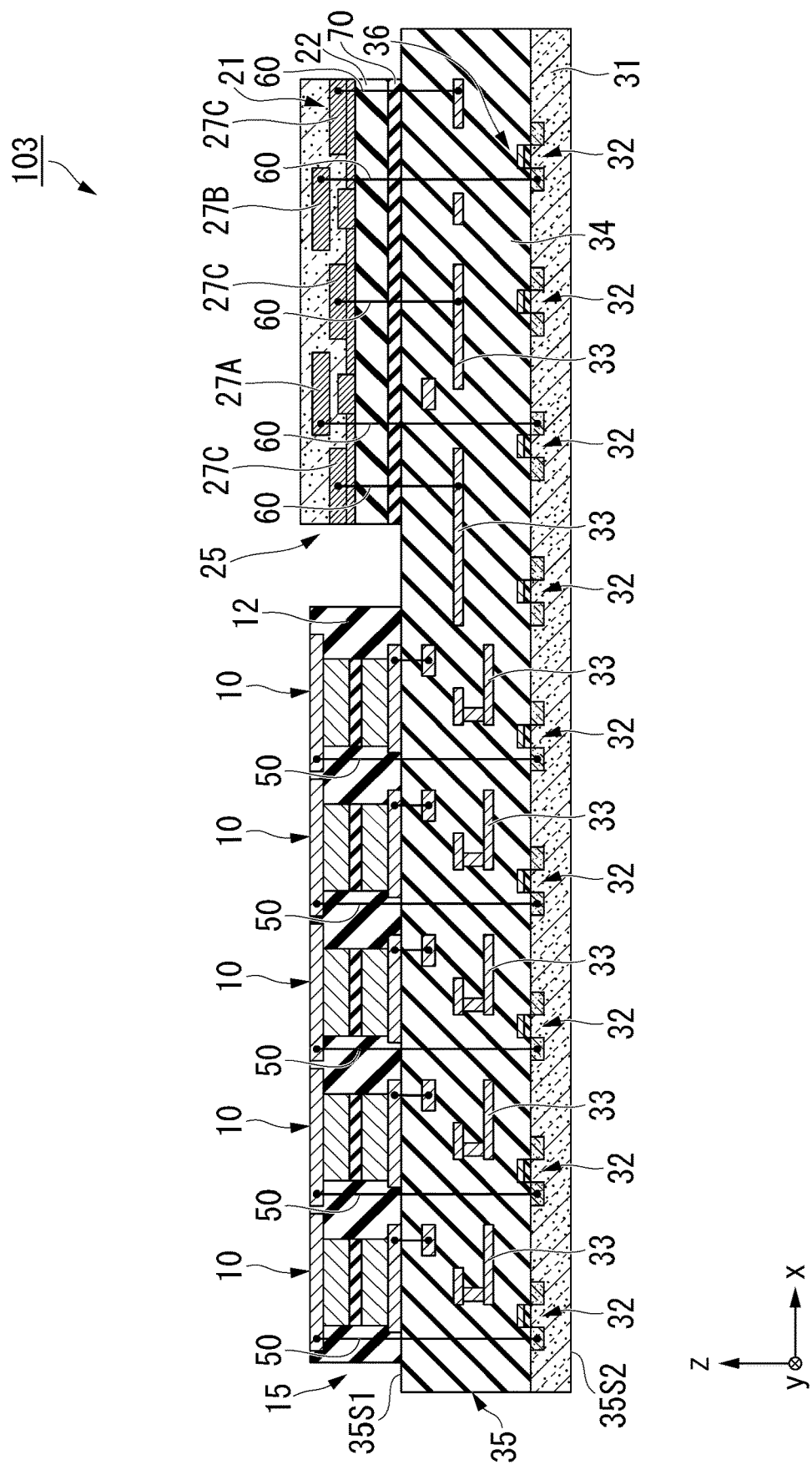
FIG. 17 is a cross-sectional view of a transceiver device according to a fourth embodiment.
Figure 18:
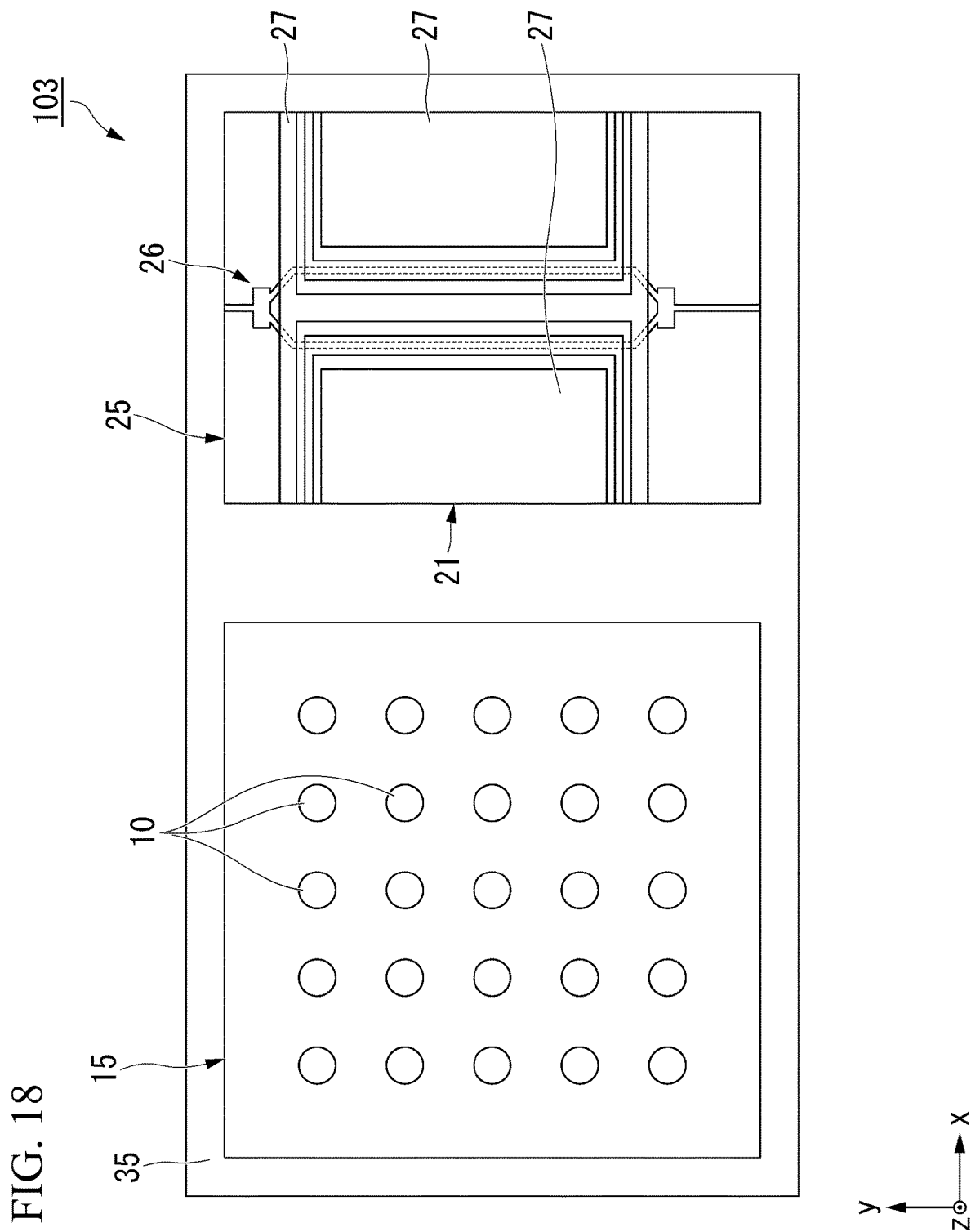
FIG. 18 is a plan view of the transceiver device according to the fourth embodiment.

FIG. 17 is a cross-sectional view of a transceiver device 103 according to a fourth embodiment. FIG. 18 is a plan view of the transceiver device 103 according to the fourth embodiment. In the fourth embodiment, components similar to those in the first embodiment are designated by the same reference signs and the description thereof will be omitted.

The transceiver device 103 is different from the transceiver device 100 according to the first embodiment in the arrangement of a receiving device 15 and a transmission device 25. The receiving device 15 and the transmission device 25 are on a first surface 35S1 side of a circuit chip 35. A magnetic element 10 and an optical modulation element 21 are on the first surface 35S1 side of the circuit chip 35.

The receiving device 15 and the transmission device 25 are arranged, for example, on the first surface 35S1 of the circuit chip 35. The receiving device 15 and the transmission device 25 are positioned at positions where they do not overlap each other when viewed from a z direction. The magnetic element 10 and the optical modulation element 21 are arranged not to overlap each other when viewed from the z direction.

The transmission device 25 is attached to the circuit chip 35 by, for example, an adhesive layer 70. In the example shown in FIG. 17, a substrate 22 of the transmission device 25 is attached to an insulating layer 34 of the circuit chip 35 via the adhesive layer 70. An integrated circuit 36 of the circuit chip 35 and the optical modulation element 21 of the transmission device 25 are electrically connected via through wiring 60. For example, the through wiring 60 passes through insulating layers (for example, a substrate 22 having insulating properties, the adhesive layer 70, and an insulating layer 34) between the optical modulation element 21 and the integrated circuit 36 in the z direction. The through wiring 60 connects the optical modulation element 21 and the integrated circuit 36. The optical modulation element 21 and the integrated circuit 36 may be electrically connected via a bump between the transmission device 25 and the circuit chip 35, as in the first embodiment. In this case, the bump between the transmission device 25 and the circuit chip 35 is provided between the substrate 22 and the insulating layer 34 sandwiching the adhesive layer 70.

The transceiver device 103 according to the fourth embodiment has effects similar to those of the transceiver device 100 according to the first embodiment.

Fifth Embodiment

Figure 19:
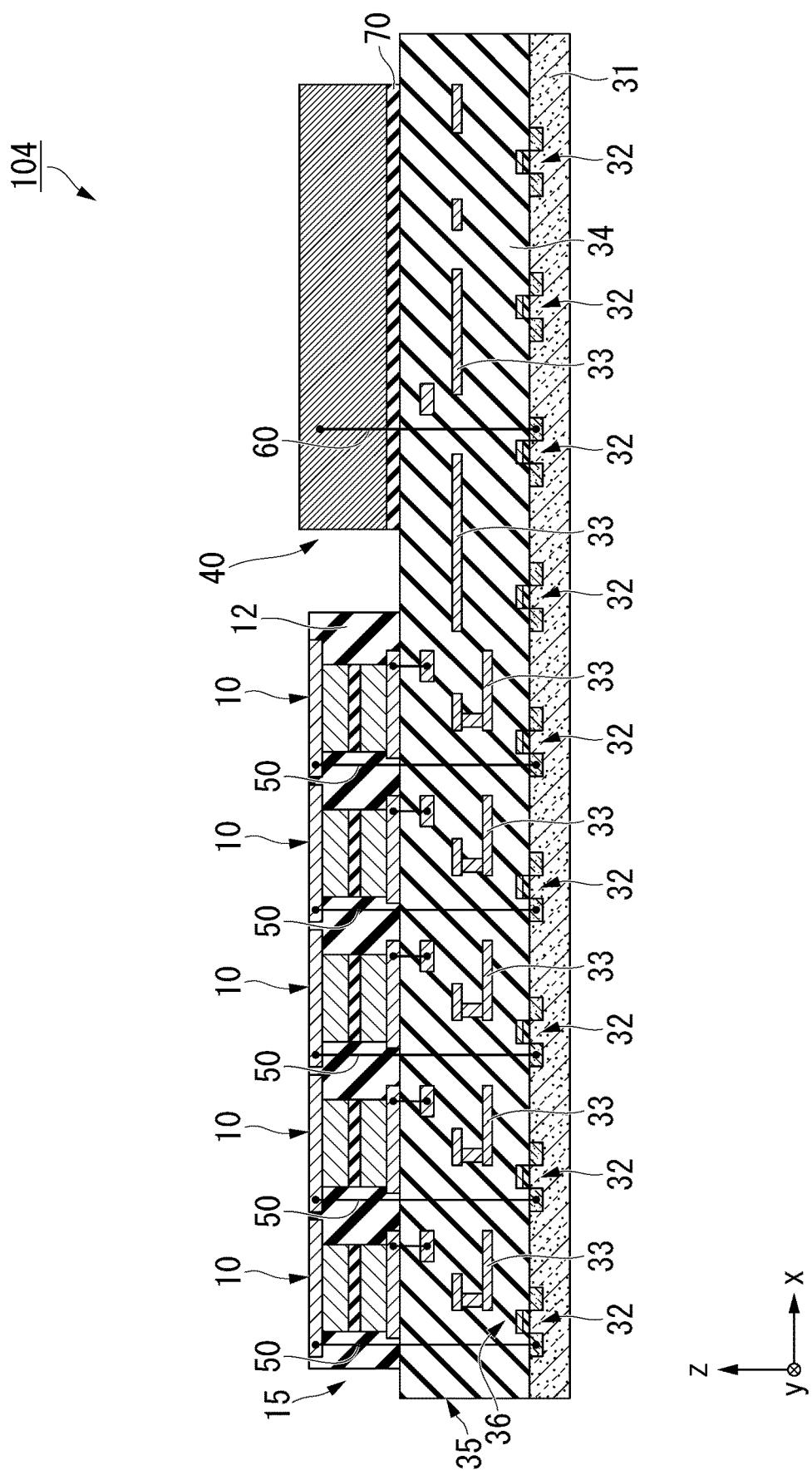
FIG. 19 is a cross-sectional view of a transceiver device according to a fifth embodiment.

FIG. 19 is a cross-sectional view of a transceiver device 104 according to a fifth embodiment. In the fifth embodiment, components similar to those in the fourth embodiment are designated by the same reference signs and the description thereof will be omitted.

A transceiver device 104 has a transmission device 40 instead of the transmission device 25 of the transceiver device 103 of the fourth embodiment. The transmission device 40 includes a modulated light output element. The modulated light output element according to the fifth embodiment is an element that outputs modulated light according to a process of directly switching ON/OFF of an output of light by switching ON/OFF of a power supply. The modulated light output element according to the fifth embodiment is, for example, a laser diode, a light emitting diode (LED), or the like. When a frequency of an optical signal output from the transmission device 40 is about several MHz, the modulated optical output element, which directly switches ON/OFF, can also sufficiently cope with the frequency.

The transceiver device 104 according to the fifth embodiment has effects similar to those of the transceiver device 100 according to the first embodiment.

Sixth Embodiment

Figure 20:
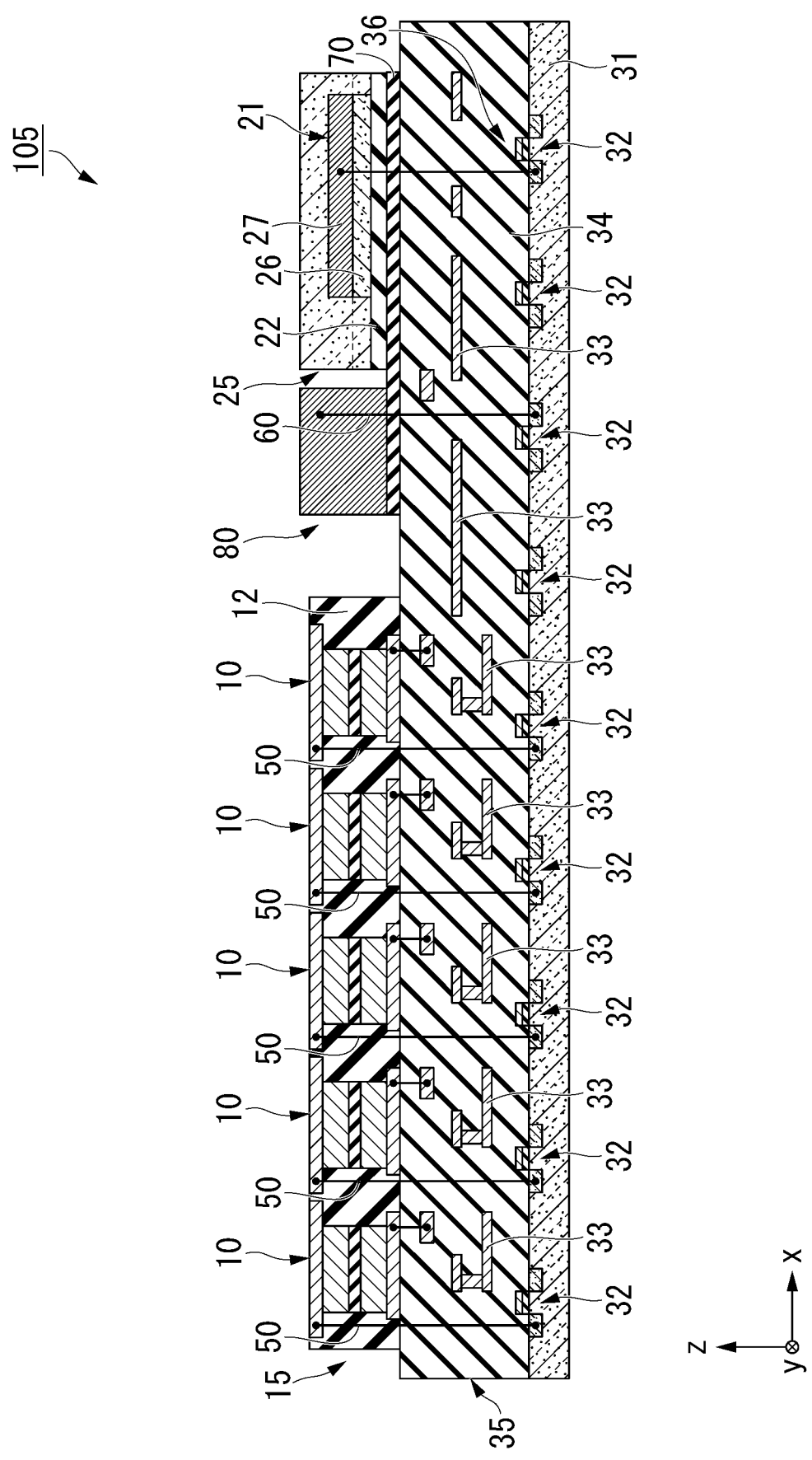
FIG. 20 is a cross-sectional view of a transceiver device according to a sixth embodiment.
Figure 21:
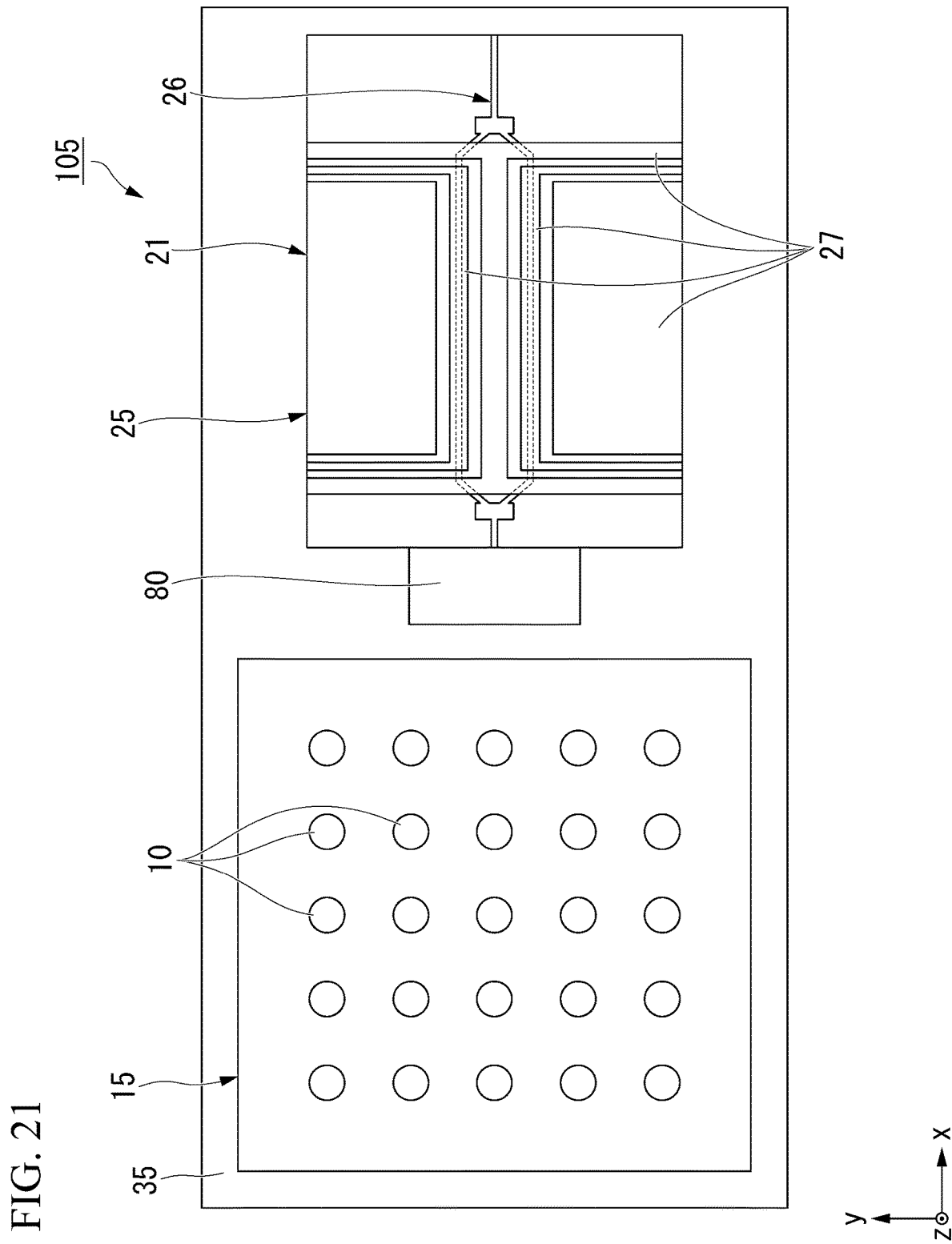
FIG. 21 is a plan view of the transceiver device according to the sixth embodiment.

FIG. 20 is a cross-sectional view of a transceiver device 105 according to a sixth embodiment. FIG. 21 is a plan view of the transceiver device 105 according to the sixth embodiment. In the sixth embodiment, components similar to those in the fourth embodiment are designated by the same reference signs and the description thereof will be omitted.

The transceiver device 105 further includes a light source 80 with respect to the transceiver device 103 of the fourth embodiment. The light source 80 is arranged on a circuit chip in a z direction. The light source 80 is on a first surface 35S1 side of a circuit chip 35. The light source 80 is arranged, for example, on the first surface 35S1 of the circuit chip 35. A receiving device 15, a transmission device 25, and the light source 80 are positioned at positions where they do not overlap each other when viewed from the z direction. A magnetic element 10, an optical modulation element 21, and the light source 80 are arranged not to overlap each other when viewed from the z direction.

The light source 80 outputs input light input to an optical modulation element 21. The light source 80 is positioned on the side of the optical modulation element 21. The light source 80 is, for example, a laser diode.

The transceiver device 105 according to the sixth embodiment including the light source 80 is packaged. The transceiver device 105 according to the sixth embodiment has effects similar to those of the transceiver device 100 according to the first embodiment.

Figure 22:
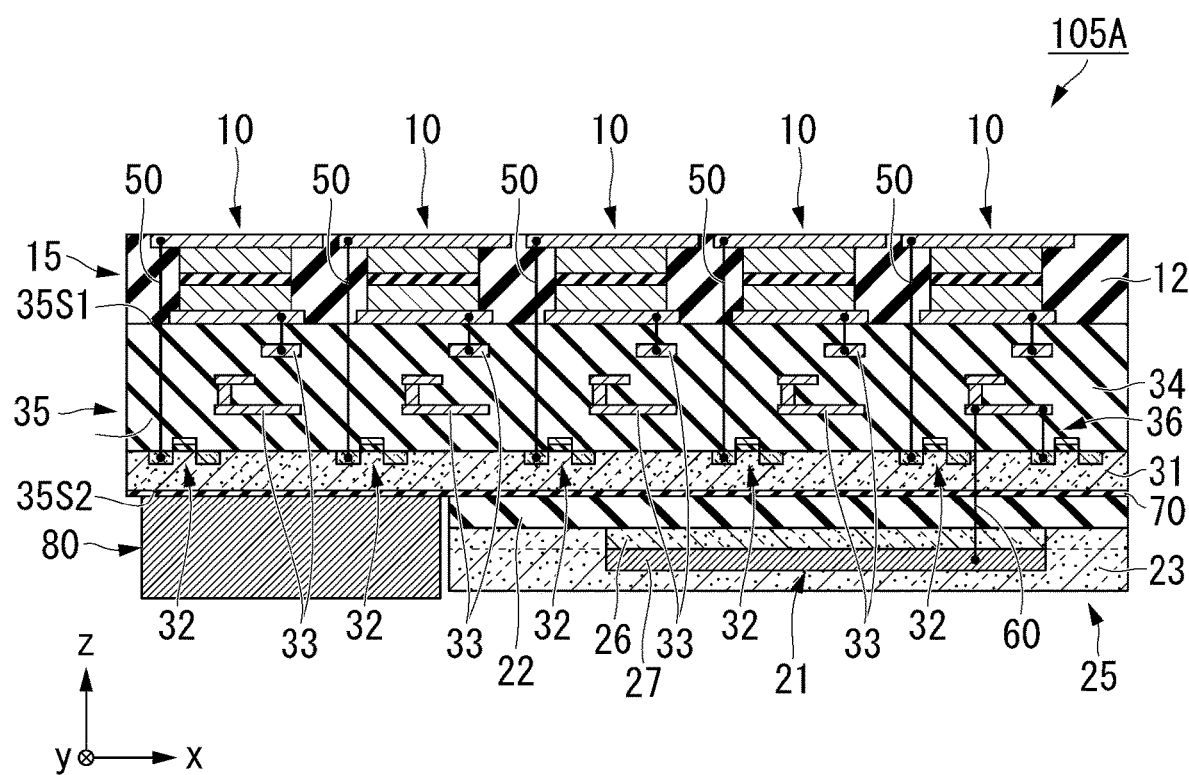
FIG. 22 is a cross-sectional view of another example of the transceiver device according to the sixth embodiment.

FIG. 20 shows an example in which the light source 80 is incorporated into the transceiver device 103 according to the fourth embodiment, but the light source 80 may be incorporated into the transceiver devices 100 to 102 according to the first to third embodiments. The light source 80 may be arranged on a side of a surface that is the same as the surface of the circuit chip 35 on which the optical modulation element 21 is arranged. FIG. 22 is a modified example of the transceiver device according to the fifth embodiment. A transceiver device 105A shown in FIG. 22 is an example in which the light source 80 is incorporated in the transceiver device 100 according to the first embodiment. In the example shown in FIG. 22, the light source 80 is on a second surface 35S2 side of the circuit chip 35.

Seventh Embodiment

Figure 23:
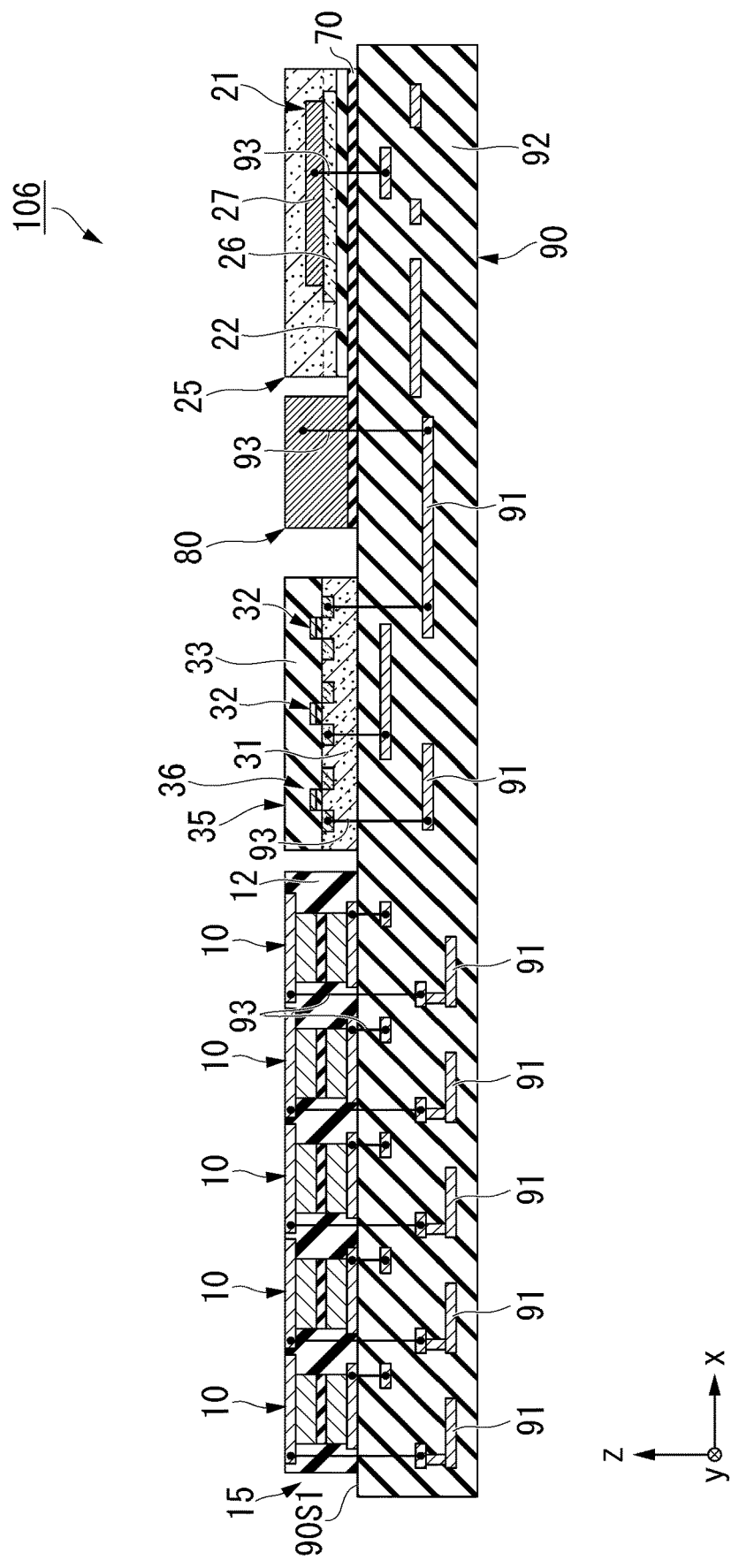
FIG. 23 is a cross-sectional view of a transceiver device according to a seventh embodiment.
Figure 24:
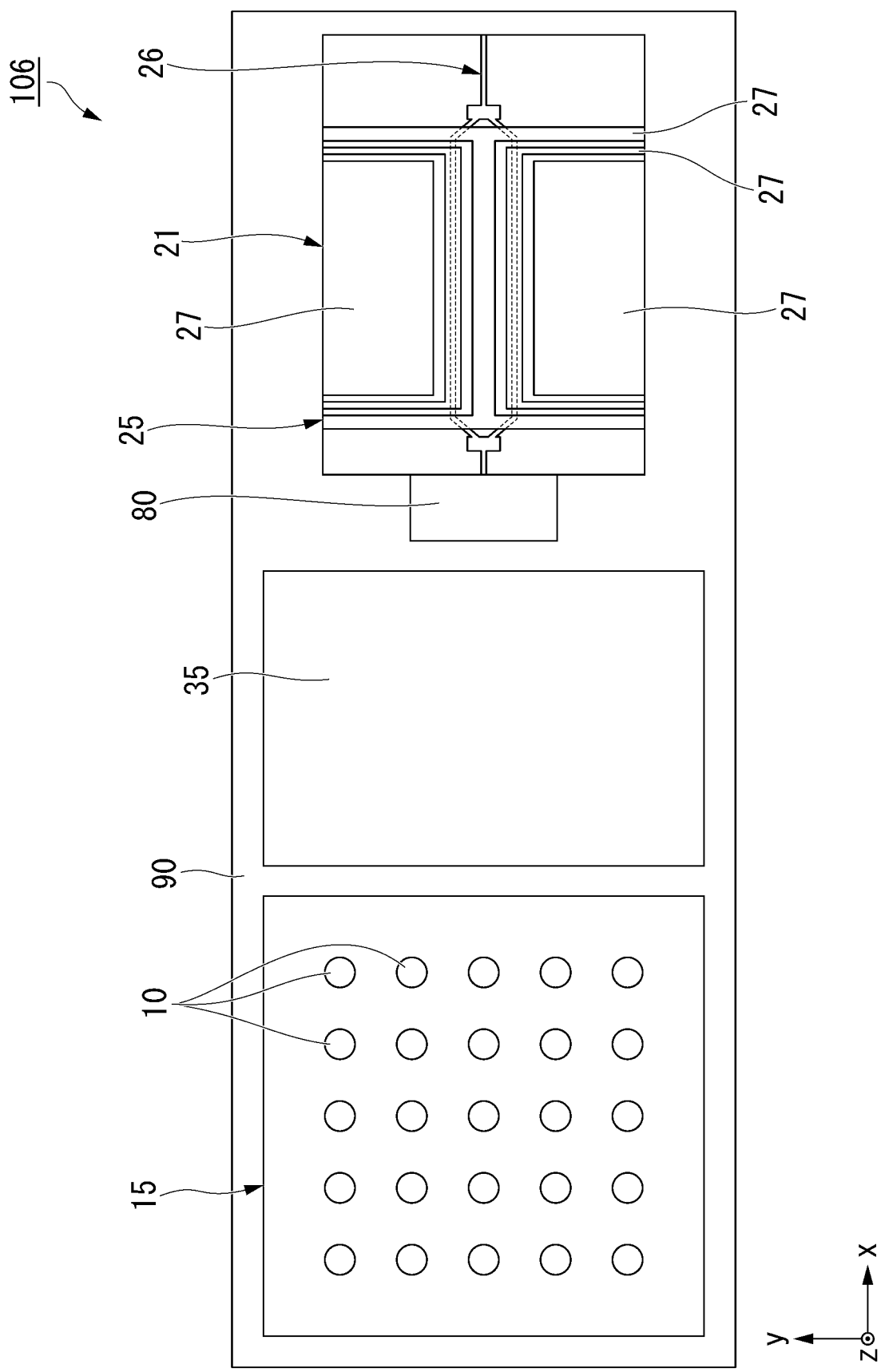
FIG. 24 is a plan view of the transceiver device according to the seventh embodiment.

FIG. 23 is a cross-sectional view of a transceiver device 106 according to a seventh embodiment. FIG. 24 is a plan view of the transceiver device 106 according to the seventh embodiment. In the seventh embodiment, components similar to those in the first embodiment are designated by the same reference signs and the description thereof will be omitted.

The transceiver device 106 includes a receiving device 15, a transmission device 25, a circuit chip 35, a light source 80, and a wiring chip 90. The receiving device 15, the transmission device 25, the light source 80, and the circuit chip 35 are on a first surface 90S1 side of the wiring chip 90. A magnetic element 10 and an optical modulation element 21 are on the first surface 90S1 side of the wiring chip 90. The receiving device 15, the transmission device 25, the light source 80, and the circuit chip 35 are arranged on the first surface 90S1 of the wiring chip 90. The receiving device 15, the transmission device 25, the light source 80, and the circuit chip 35 are positioned at positions where they do not overlap each other when viewed from a z direction. The magnetic element 10, the optical modulation element 21, and the circuit chip 35 are arranged not to overlap each other when viewed from the z direction.

The wiring chip 90 includes wirings 91 and an insulating layer 92. Each of the magnetic element 10, the optical modulation element 21, the light source 80, and an integrated circuit 36 of the circuit chip 35 is electrically connected to the wiring chip 90 by through wiring 93. The wiring 91 and the through wiring 93 electrically connect each of the magnetic element 10, the optical modulation element 21, and the light source 80 to the integrated circuit 36 of the circuit chip 35. The magnetic element 10 is connected to any wiring 91. The optical modulation element 21 is connected to any wiring 91. The integrated circuit 36 (an electronic component 32 or a wiring 33) is connected to any wiring 91. The magnetic element 10, the optical modulation element 21, and the light source 80 are controlled by the integrated circuit 36 of the circuit chip 35.

The transceiver device 106 according to the seventh embodiment has effects similar to those of the transceiver device 100 according to the first embodiment. Also, the transceiver device 106 according to the seventh embodiment can be packaged after each element is manufactured separately. Optimization of each element is easy.

The present disclosure is not limited to the above-described embodiments and modified examples and various modifications and changes can be made within the scope of the subject matter of the present disclosure described within the scope of the claims. For example, the feature configurations of the above-described embodiment and modified examples may be combined.

For example, although an example in which the modulated light output element configured to switch ON/OFF of an output of light directly is used instead of the optical modulation element 21 of the fourth embodiment has been described in the fifth embodiment, the modulated light output element configured to directly switch ON/OFF of an output of light may be used instead of the optical modulation element 21 of the first to third embodiments. Also, the modulated light output element configured to directly switch ON/OFF of an output of light may be used instead of the optical modulation elements 21 and the light sources 80 of the sixth and seventh embodiments.

Although examples in which the transceiver devices according to the first to seventh embodiments are applied to the communication system 200 show in FIG. 1 have been described above, the communication system is not limited thereto.

Figure 25:
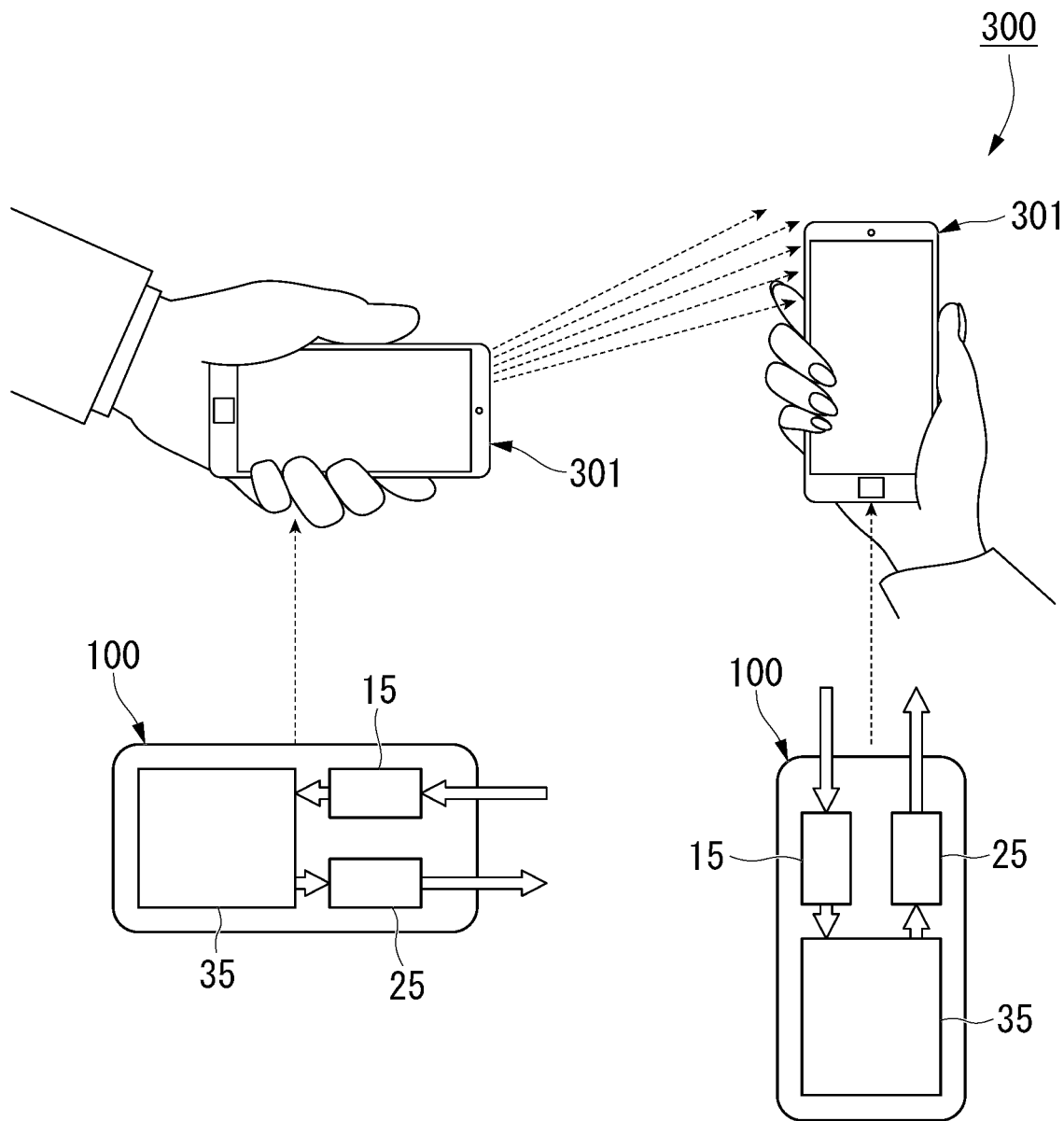
FIG. 25 is another application example of the communication system.

For example, FIG. 25 is a conceptual diagram of another example of the communication system. In a communication system 300 shown in FIG. 25, communication between two portable terminal devices 301 is performed. The portable terminal device 301 is, for example, a smartphone, a tablet, or the like.

Each of the portable terminal devices 301 includes the above-described transceiver device 100. The transceiver device 100 may be one of the transceiver devices 101 to 106 other than that of the first embodiment. An optical signal transmitted from the transmission device 25 of one portable terminal device 301 is received by the receiving device 15 of the other portable terminal device 301. The light used for transmission/reception between the portable terminal devices 301 is, for example, visible light. Each receiving device 15 has a magnetic element and the magnetic element converts an optical signal into an electrical signal.

Figure 26:
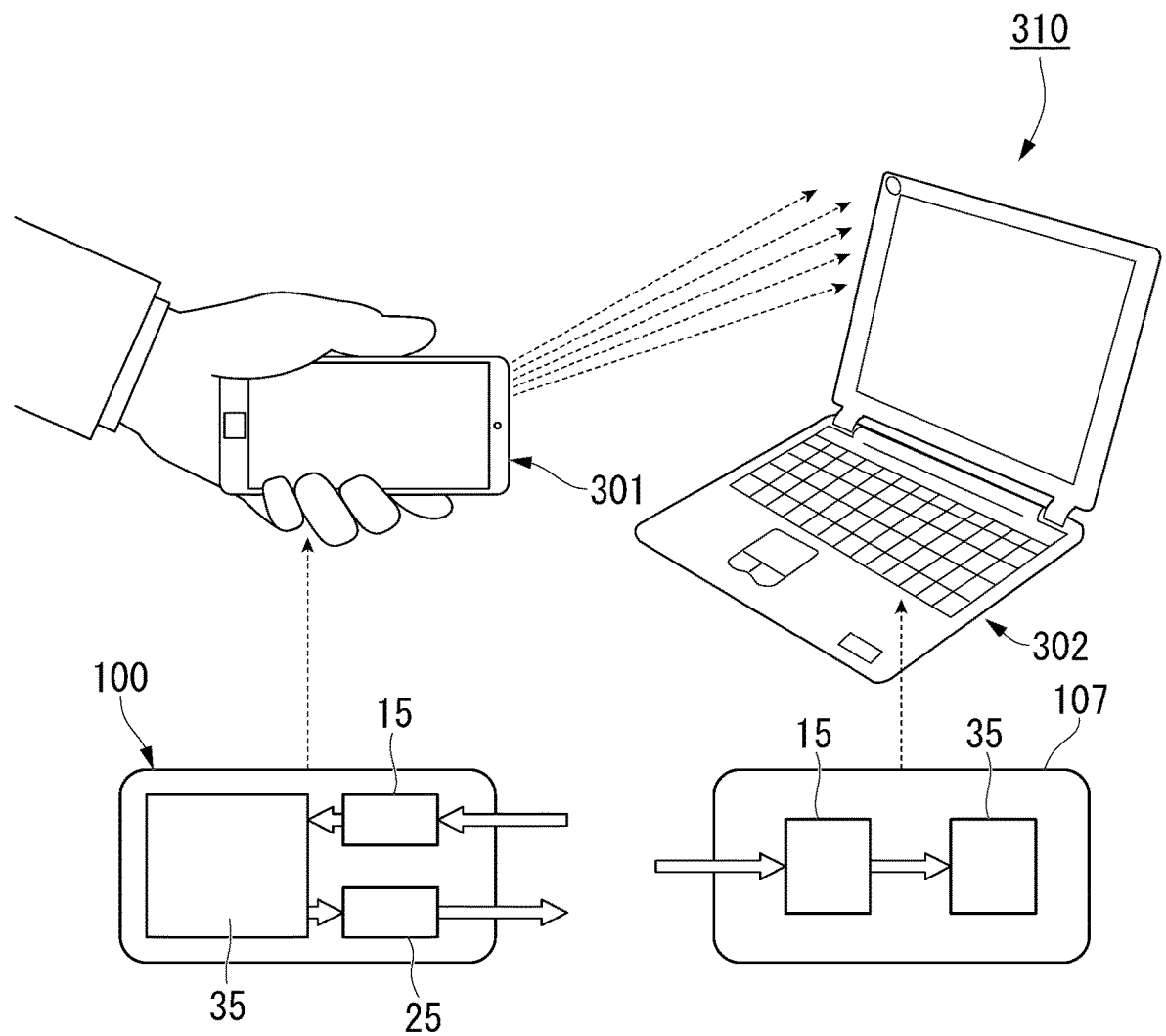
FIG. 26 is another application example of the communication system.

Also, for example, FIG. 26 is a conceptual diagram of another example of the communication system. In a communication system 310 shown in FIG. 26, communication between a portable terminal device 301 and an information processing device 302 is performed. The information processing device 302 is, for example, a personal computer.

The portable terminal device 301 includes a transceiver device 100 and the information processing device 302 includes a receiving device 107. The transceiver device 100 may be one of the transceiver devices 101 to 106 other than that of the first embodiment. The information processing device 302 may include any one of the transceiver devices 100 to 106 instead of the receiving device 107. An optical signal transmitted from a transmission device 25 of the portable terminal device 301 is received by a receiving device 15 of the information processing device 302. Light used for transmission/reception between the portable terminal device 301 and the information processing device 302 is, for example, visible light. Each receiving device 15 has a magnetic element, and the magnetic element converts an optical signal into an electrical signal.

What is claimed is:

1. A transceiver device comprising:
   a receiving device including a magnetic element having a first ferromagnetic layer, a second ferromagnetic layer, and a spacer layer sandwiched between the first ferromagnetic layer and the second ferromagnetic layer, the receiving device being configured to receive an optical signal;
   a transmission device including a modulated light output element, the transmission device being configured to transmit an optical signal; and
   a circuit chip including an integrated circuit electrically connected to the magnetic element and the modulated light output element,
   wherein the magnetic element and the modulated light output element are arranged in a direction perpendicular to a surface of the circuit chip, and
   a position of the circuit chip in the direction is between a position of the magnetic element in the direction and a position of the modulated light output element in the direction.

2. The transceiver device according to claim 1,
   wherein the magnetic element and the integrated circuit are electrically connected via first through wiring that passes through an insulating layer between the magnetic element and the integrated circuit, and
   the modulated light output element and the integrated circuit are electrically connected via second through wiring that passes through an insulating layer between the modulated light output element and the integrated circuit.

3. The transceiver device according to claim 1,
   wherein the modulated light output element and the integrated circuit are electrically connected via a bump between the transmission device and the circuit chip.

4. The transceiver device according to claim 1, wherein the modulated light output element is an optical modulation element.

5. The transceiver device according to claim 4,
   wherein the optical modulation element includes a waveguide, and
   the waveguide includes lithium niobate.

6. The transceiver device according to claim 1, further comprising:
   an input portion configured to apply light including a signal to the magnetic element;
   an output portion configured to output light including a signal generated by the modulated light output element;
   a first fiber configured to connect the input portion to an external portion; and
   a second fiber configured to connect the output portion to an external portion.

7. A transceiver device comprising:
   a receiving device including a magnetic element having a first ferromagnetic layer, a second ferromagnetic layer, and a spacer layer sandwiched between the first ferromagnetic layer and the second ferromagnetic layer, the receiving device being configured to receive an optical signal;
   a transmission device including a modulated light output element, the transmission device being configured to transmit an optical signal; and
   a circuit chip including an integrated circuit electrically connected to the magnetic element and the modulated light output element,
   wherein the magnetic element and the modulated light output element are arranged in a direction perpendicular to a surface of the circuit chip, and
   a position of the magnetic element in the direction is between a position of the modulated light output element in the direction and a position of the circuit chip in the direction.

8. The transceiver device according to claim 7,
   wherein the magnetic element and the integrated circuit are electrically connected via first through wiring that passes through an insulating layer between the magnetic element and the integrated circuit, and
   the modulated light output element and the integrated circuit are electrically connected via second through wiring that passes through an insulating layer between the modulated light output element and the integrated circuit.

9. The transceiver device according to claim 7,
   wherein the modulated light output element and the integrated circuit are electrically connected via a bump between the transmission device and the circuit chip.

10. The transceiver device according to claim 7, wherein the modulated light output element is an optical modulation element.

11. The transceiver device according to claim 10,
    wherein the optical modulation element includes a waveguide, and
    the waveguide includes lithium niobate.

12. The transceiver device according to claim 7, further comprising:
    an input portion configured to apply light including a signal to the magnetic element;
    an output portion configured to output light including a signal generated by the modulated light output element;
    a first fiber configured to connect the input portion to an external portion; and
    a second fiber configured to connect the output portion to an external portion.

13. A transceiver device comprising:
    a receiving device including a magnetic element having a first ferromagnetic layer, a second ferromagnetic layer, and a spacer layer sandwiched between the first ferromagnetic layer and the second ferromagnetic layer, the receiving device being configured to receive an optical signal;
    a transmission device including a modulated light output element, the transmission device being configured to transmit an optical signal; and
    a circuit chip including an integrated circuit electrically connected to the magnetic element and the modulated light output element,
    wherein the magnetic element and the modulated light output element are arranged in a direction perpendicular to a surface of the circuit chip, and
    a position of the modulated light output element in the direction is between a position of the magnetic element in the direction and a position of the circuit chip in the direction.

14. The transceiver device according to claim 13,
    wherein the magnetic element and the integrated circuit are electrically connected via first through wiring that passes through an insulating layer between the magnetic element and the integrated circuit, and the modulated light output element and the integrated circuit are electrically connected via second through wiring that passes through an insulating layer between the modulated light output element and the integrated circuit.

15. The transceiver device according to claim 13, wherein the modulated light output element and the integrated circuit are electrically connected via a bump between the transmission device and the circuit chip.

16. The transceiver device according to claim 13, wherein the modulated light output element is an optical modulation element.

17. The transceiver device according to claim 16, wherein the optical modulation element includes a waveguide, and the waveguide includes lithium niobate.

18. The transceiver device according to claim 13, further comprising:

an input portion configured to apply light including a signal to the magnetic element;

an output portion configured to output light including a signal generated by the modulated light output element;

a first fiber configured to connect the input portion to an external portion; and a second fiber configured to connect the output portion to an external portion.

\* \* \* \* \*